United States Patent
Jones et al.

(10) Patent No.: US 12,021,482 B2
(45) Date of Patent: Jun. 25, 2024

(54) STRUCTURE AND CANOPY FOR MOUNTING OF PHOTOVOLTAIC PANEL

(71) Applicant: Distributed Solar Development, LLC, Schenectady, NY (US)

(72) Inventors: Benjamin Robert Jones, Lafayette, CO (US); Alex James Norman, Brooklyn, NY (US); Kumarapatabendige Nipun Darshana Silva, Staten Island, NY (US)

(73) Assignee: DISTRIBUTED SOLAR DEVELOPMENT, LLC, Schenectady, NY (US)

( * ) Notice: Subject to any disclaimer, the term of this patent is extended or adjusted under 35 U.S.C. 154(b) by 0 days.

(21) Appl. No.: 18/319,609

(22) Filed: May 18, 2023

(65) Prior Publication Data

US 2023/0378900 A1   Nov. 23, 2023

Related U.S. Application Data

(60) Provisional application No. 63/364,962, filed on May 19, 2022.

(51) Int. Cl.
| | |
|---|---|
| *H02S 20/23* | (2014.01) |
| *E04H 6/02* | (2006.01) |
| *F24S 25/12* | (2018.01) |
| *H02S 20/10* | (2014.01) |
| *H02S 20/24* | (2014.01) |
| *H02S 20/32* | (2014.01) |
| *F24S 25/63* | (2018.01) |
| *F24S 40/44* | (2018.01) |

(52) U.S. Cl.
CPC ............ *H02S 20/23* (2014.12); *F24S 25/12* (2018.05); *H02S 20/10* (2014.12); *H02S 20/24* (2014.12); *H02S 20/32* (2014.12); *E04H 6/025* (2013.01); *F24S 25/63* (2018.05); *F24S 40/44* (2018.05); *Y02E 10/47* (2013.01)

(58) Field of Classification Search
CPC .......... E04H 6/025; F24S 25/63; H02S 20/23; H02S 20/24; H02S 20/32; Y02E 10/47
See application file for complete search history.

(56) References Cited

U.S. PATENT DOCUMENTS

| | | | |
|---|---|---|---|
| 8,511,007 B2 | 8/2013 | Powers, III | |
| 8,794,583 B2 | 8/2014 | Poivet et al. | |
| 10,622,935 B1 * | 4/2020 | Liu | ........................ H02S 30/00 |

(Continued)

FOREIGN PATENT DOCUMENTS

| | | | | |
|---|---|---|---|---|
| DE | 202006020180 U1 | 12/2007 | | |
| DE | 102012009834 A1 * | 12/2012 | ............ | F16B 7/0473 |
| EP | 3850749 A1 | 7/2021 | | |

*Primary Examiner* — Jessie T Fonseca
(74) *Attorney, Agent, or Firm* — Hoffman Warnick LLC

(57) ABSTRACT

Embodiments of the disclosure provide a structure and canopy for mounting of a photovoltaic panel. A structure of the disclosure may provide a rail mounting clip including a first segment shaped for mounting on a purlin surface, a second segment at a lateral end of the first segment and extending perpendicularly outwardly therefrom. A rail assembly is coupled to the rail mounting clip and has a slot substantially aligned with a centerline axis of the rail assembly. The slot receives the second segment of the rail mounting clip, and the rail assembly is shaped for mounting a photovoltaic panel thereon.

21 Claims, 31 Drawing Sheets

(56) References Cited

U.S. PATENT DOCUMENTS

| | | | |
|---|---|---|---|
| 10,920,424 B2 | 2/2021 | Jones et al. | |
| 10,941,574 B2 | 3/2021 | Jones et al. | |
| 2008/0310913 A1* | 12/2008 | Urban | H02S 20/23 |
| | | | 403/404 |
| 2009/0223142 A1 | 9/2009 | Shingleton et al. | |
| 2010/0000165 A1 | 1/2010 | Koller | |
| 2010/0000596 A1 | 1/2010 | Mackler | |
| 2010/0132274 A1 | 6/2010 | Reyal et al. | |
| 2011/0094559 A1 | 4/2011 | Potter et al. | |
| 2012/0131866 A1 | 5/2012 | Batut et al. | |
| 2012/0273031 A1* | 11/2012 | Sagayama | F24S 25/13 |
| | | | 136/251 |
| 2013/0299659 A1* | 11/2013 | Sader | H02S 20/23 |
| | | | 29/428 |
| 2013/0320175 A1* | 12/2013 | Kemple | F24S 25/65 |
| | | | 248/316.1 |
| 2015/0183066 A1 | 7/2015 | Lippert et al. | |
| 2015/0184896 A1 | 7/2015 | Lippert et al. | |
| 2018/0187411 A1* | 7/2018 | Shang | F24S 25/636 |
| 2018/0248508 A1 | 8/2018 | Keller et al. | |
| 2019/0169871 A1 | 6/2019 | McKibben et al. | |
| 2019/0280644 A1* | 9/2019 | Yamashita | H01L 31/0508 |
| 2019/0386601 A1* | 12/2019 | Keller | E04H 6/025 |
| 2020/0115906 A1* | 4/2020 | Jones | E04D 13/0645 |
| 2021/0102577 A1* | 4/2021 | Kovacs | H02S 20/20 |
| 2021/0135620 A1* | 5/2021 | Needham | H02S 20/10 |
| 2021/0194409 A1* | 6/2021 | Gruetzner | F24S 25/70 |

\* cited by examiner

STRUCTURE AND CANOPY FOR MOUNTING OF PHOTOVOLTAIC PANEL

TECHNICAL FIELD

The disclosure relates generally to a structure and canopy for mounting of a photovoltaic panel. Embodiments of the disclosure may be implemented in a solar carport, canopy, and/or other shade structure.

BACKGROUND

A "solar carport" is an overhead shade canopy for mounting photovoltaic panels for generating energy. Solar carports are installed on parking areas to shield vehicles and simultaneously generate energy from sunlight throughout the day. In certain types of solar carports, photovoltaic panels may be arranged on the solar carport at a variety of angled orientations, e.g., upwards and downwards, to orient various panels toward the direction of sunlight.

No matter the orientation, photovoltaic panels and their supporting structures may experience various stresses and forces. These stresses and forces can occur from environmental conditions (e.g., wind and precipitation) imparting upward or downward forces (including weight) on the photovoltaic panels and/or their supporting structures. The coupling of photovoltaic panels to a supporting structure, regardless of the structural materials used, may affect operation of the photovoltaic panels.

SUMMARY

All aspects, examples and features mentioned below can be combined in any technically possible way.

Aspects of the disclosure provide a structure including: a rail mounting clip including: a first segment shaped for mounting on a purlin surface, and a second segment at a lateral end of the first segment and extending perpendicularly outwardly therefrom; and a rail assembly coupled to the rail mounting clip and having a slot substantially aligned with a centerline axis of the rail assembly, the slot receiving the second segment of the rail mounting clip, where the rail assembly is shaped for mounting a photovoltaic panel thereon.

Further aspects of the disclosure provide any of the preceding aspects, and an upper surface of the second segment is angled relative to the purlin surface.

Further aspects of the disclosure provide any of the preceding aspects, and further including an integrated wire router within the rail mounting clip and is configured for passage of wires from the photovoltaic panel therethrough.

Further aspects of the disclosure provide any of the preceding aspects, and where the integrated wire router includes a hole through the second segment.

Further aspects of the disclosure provide any of the preceding aspects, and further including a structural purlin having the purlin surface thereon, where the structural purlin is oriented horizontally perpendicularly with respect to the rail assembly.

Further aspects of the disclosure provide any of the preceding aspects, and where the rail assembly includes a pair of parallel rails having the slot therebetween.

Further aspects of the disclosure provide any of the preceding aspects, and where the pair of parallel rails are each configured to mount a respective photovoltaic panel thereon, such that the rail assembly is configured for placement between two photovoltaic panels.

Other aspects of the disclosure provide a canopy structure, including: a plurality of structural purlins each mounted on a beam with an orientation horizontally perpendicular to an orientation of the beam; a plurality of rail mounting clips each located on a surface of a respective structural purlin; and a plurality of rail assemblies each coupled to a respective one of the plurality of rail mounting clips. Each of the plurality of rail mounting clips includes: a first segment shaped for mounting on a purlin surface, and a second segment at a lateral end of the first segment and extending perpendicularly outwardly therefrom. Each of the plurality of rail assemblies includes a slot substantially aligned with a centerline axis of the rail assembly, the slot receiving the second segment of the respective rail mounting clip, such that the rail assembly is shaped for mounting a photovoltaic panel thereon.

Further aspects of the disclosure provide any of the preceding aspects, and where an upper surface of each second segment is angled relative to the purlin surface thereunder.

Further aspects of the disclosure provide any of the preceding aspects, and where at least two of the plurality of rail mounting clips have upper surfaces sloped toward each other.

Further aspects of the disclosure provide any of the preceding aspects, and where an upper surface of each second segment has a substantially uniform geometry.

Further aspects of the disclosure provide any of the preceding aspects, and further including an integrated wire router within each rail mounting clip, where the integrated wire router is configured for passage of wires from the photovoltaic panel therethrough.

Further aspects of the disclosure provide any of the preceding aspects, and where the integrated wire router includes a hole through the second segment.

Further aspects of the disclosure provide any of the preceding aspects, and where at least one of the plurality of rail assemblies includes a pair of parallel rails having the slot therebetween.

Further aspects of the disclosure provide any of the preceding aspects, and where the pair of parallel rails are each configured to mount a respective photovoltaic panel thereon, such that the rail assembly is configured for placement between two photovoltaic panels.

Further aspects of the disclosure provide any of the preceding aspects, and where the plurality of rail mounting clips each have a second segment shaped to define a single slope canopy.

Further aspects of the disclosure provide any of the preceding aspects, and where the plurality of rail mounting clips each have a second segment with a uniformly shaped upper surface to define a louvered canopy.

Further aspects of the disclosure provide any of the preceding aspects, and where the plurality of rail mounting clips each have a second segment shaped to define a dual slope canopy.

Further aspects of the disclosure provide any of the preceding aspects, and further including a strap connecting a low point between two adjacent photovoltaic panels each mounted on oppositely sloped rail assemblies of the dual slope canopy.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
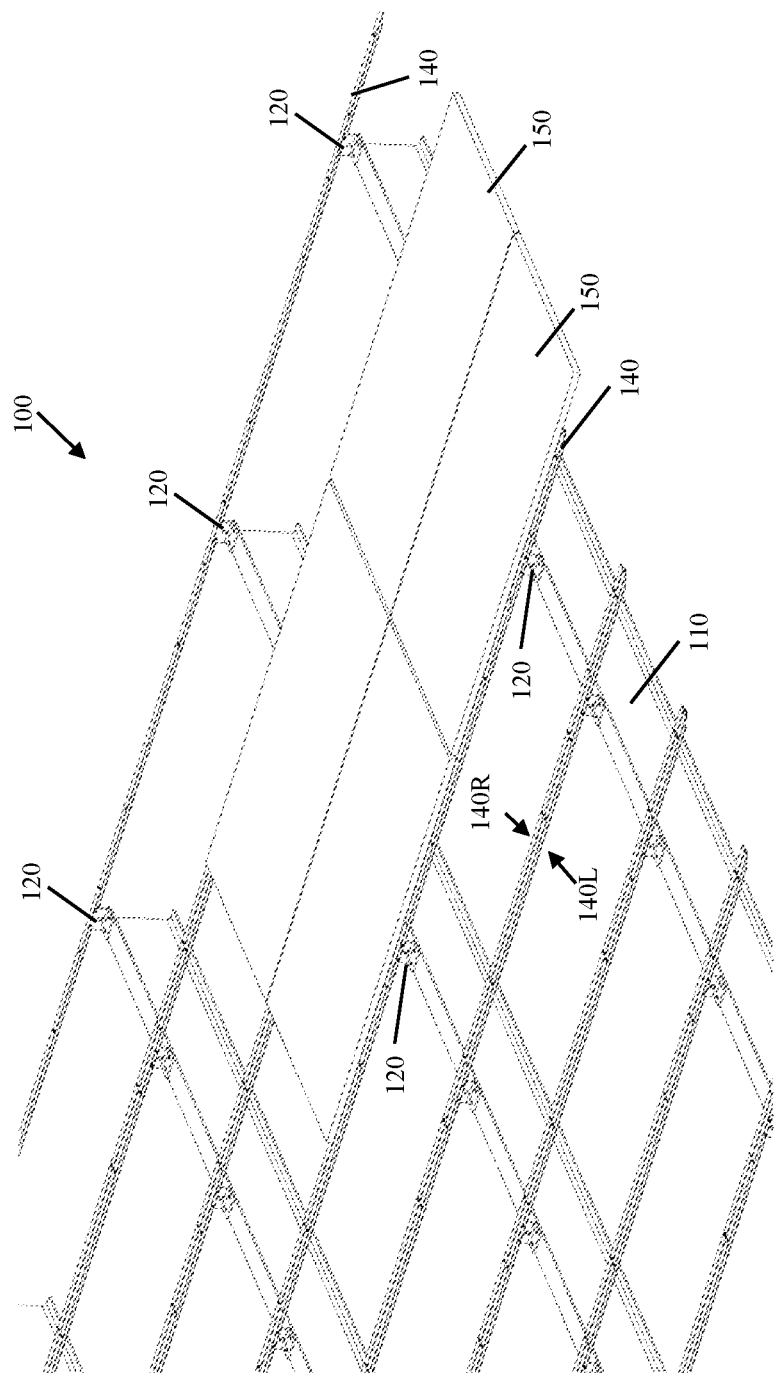
FIG. 1 is a perspective view of a single slope canopy according to embodiments of the disclosure.
Figure 2:
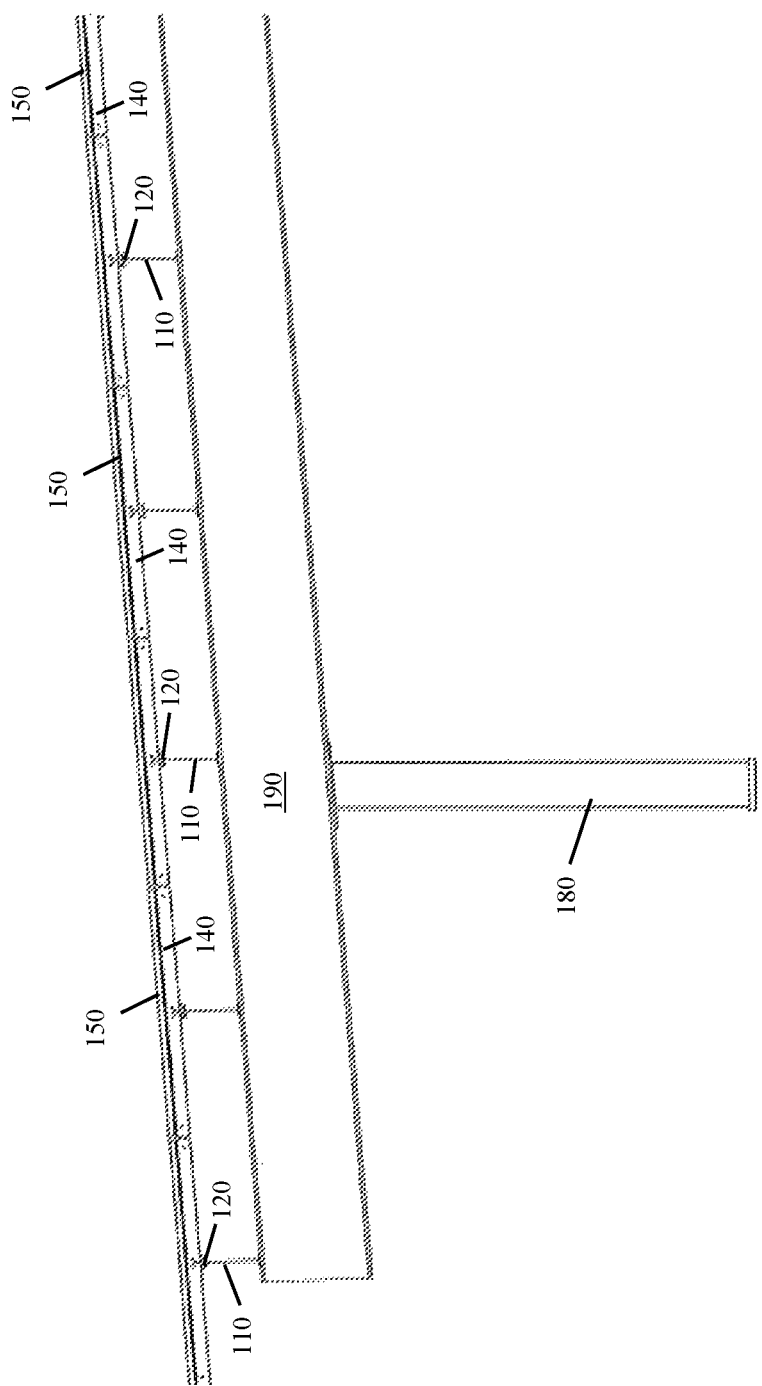
FIG. 2 is a partial side view of a single slope canopy according to embodiments of the disclosure.
Figure 3:
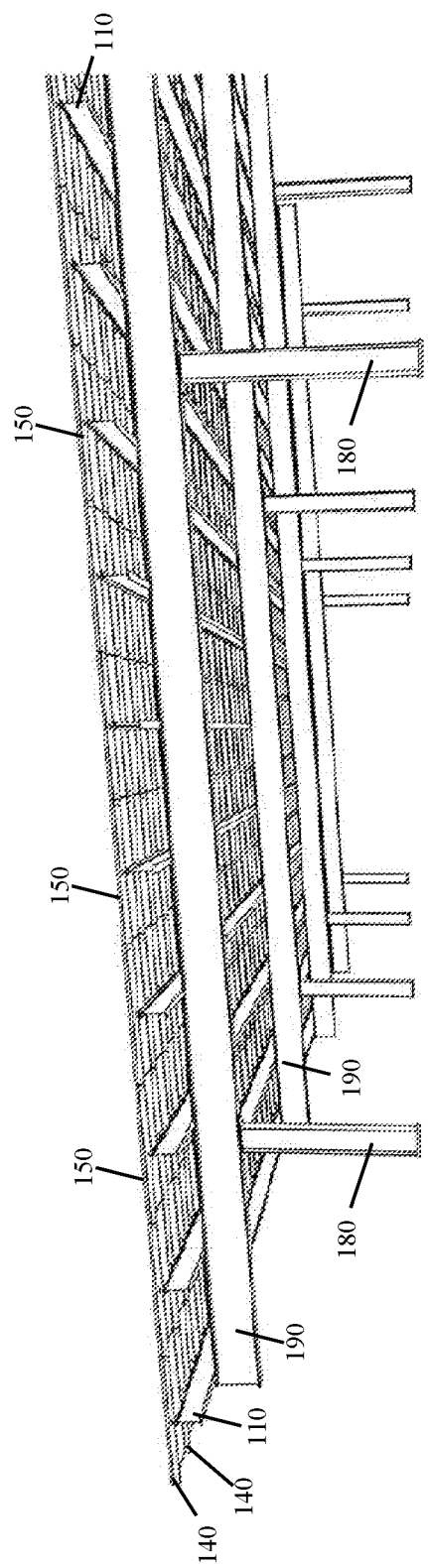
FIG. 3 is a side perspective view of a single slope canopy according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant components within a photovoltaic panel array and its supporting structure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

When an element or layer is referred to as being "on," "upon," "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof "Optional" or "optionally" means that the subsequently described event or circumstance may or may not occur or that the subsequently describe component or element may or may not be present, and that the description includes instances where the event occurs, or the component is present and instances where it does not or is not present.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The embodiments set forth herein provide a structure and canopy for mounting photovoltaic panels. A structure or canopy of the disclosure may include a rail mounting clip. The rail mounting clip may have a first segment shaped for mounting on a purlin surface, i.e., the top of a structural member extending horizontally crosswise over one or more horizontal beams. A second segment may be at a lateral end of the first segment and may extend perpendicularly outwardly therefrom. According to one example, the first segment is mounted on and/or coupled to the purlin surface and the second segment extends vertically upward from the first segment. A rail assembly is coupled to the rail mounting clip and includes a slot substantially aligned with a centerline axis of the rail assembly. The slot of the rail assembly receives the second segment of the rail mounting clip. The rail assembly is shaped for mounting a photovoltaic panel thereon. In various embodiments, an upper surface of the second segment may be shaped to accommodate various types of photovoltaic panel arrangements. Embodiments of the disclosure are suitable for use with arrays of photovoltaic panels with arrangements such as, without limitation: planar canopies, single slope canopies, dual slope canopies, louvered canopies, and/or other types of structural arrangements currently known or later developed.

Referring generally to FIGS. 1-10, embodiments of the disclosure may be implemented with a single slope canopy 100. A single slope canopy 100 is structured for an array of photovoltaic panels 150 (also known as "photovoltaic modules") to be arranged in a sloped arrangement whereby the photovoltaic panels 150 together define a uniformly sloped upper surface. As discussed herein, single slope canopy 100 may include a set of rail mounting clips 120, each of which mounts a photovoltaic panel 150 and structurally couples the photovoltaic panel 150 to a single structural purlin 110. The structural purlin 110, as discussed herein, extends crosswise over one or more support beams or rafters. FIG. 1 illustrates an isometric view of an example single slope solar carport or canopy 100 with a rail mounting clip or bracket (simply "rail mounting clip" hereafter) 120 that enables connection of a photovoltaic panel 150 of the photovoltaic panel array to a single structural purlin 110 that spans further than panel(s) 150 between support beams or rafters 180 (FIGS. 14-20). The single slope canopy 100 may provide and/or define part of a solar carport by being installed and/or built on a parking area, by way of example, and configured to shield one or more vehicles (not shown) while also generating electric power using sunlight.

Figure 4:
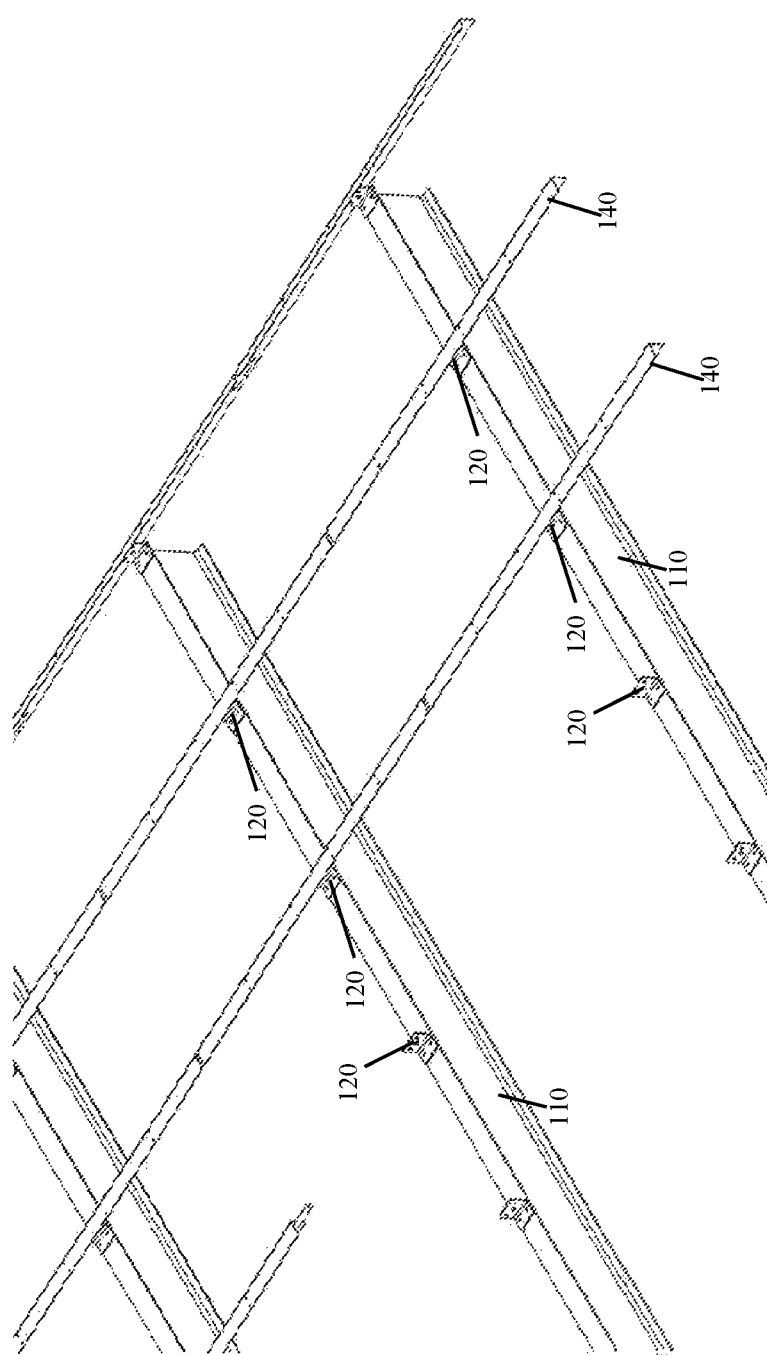
FIGS. 4 and 5 are expanded side views of a single slope canopy according to embodiments of the disclosure.
Figure 5:
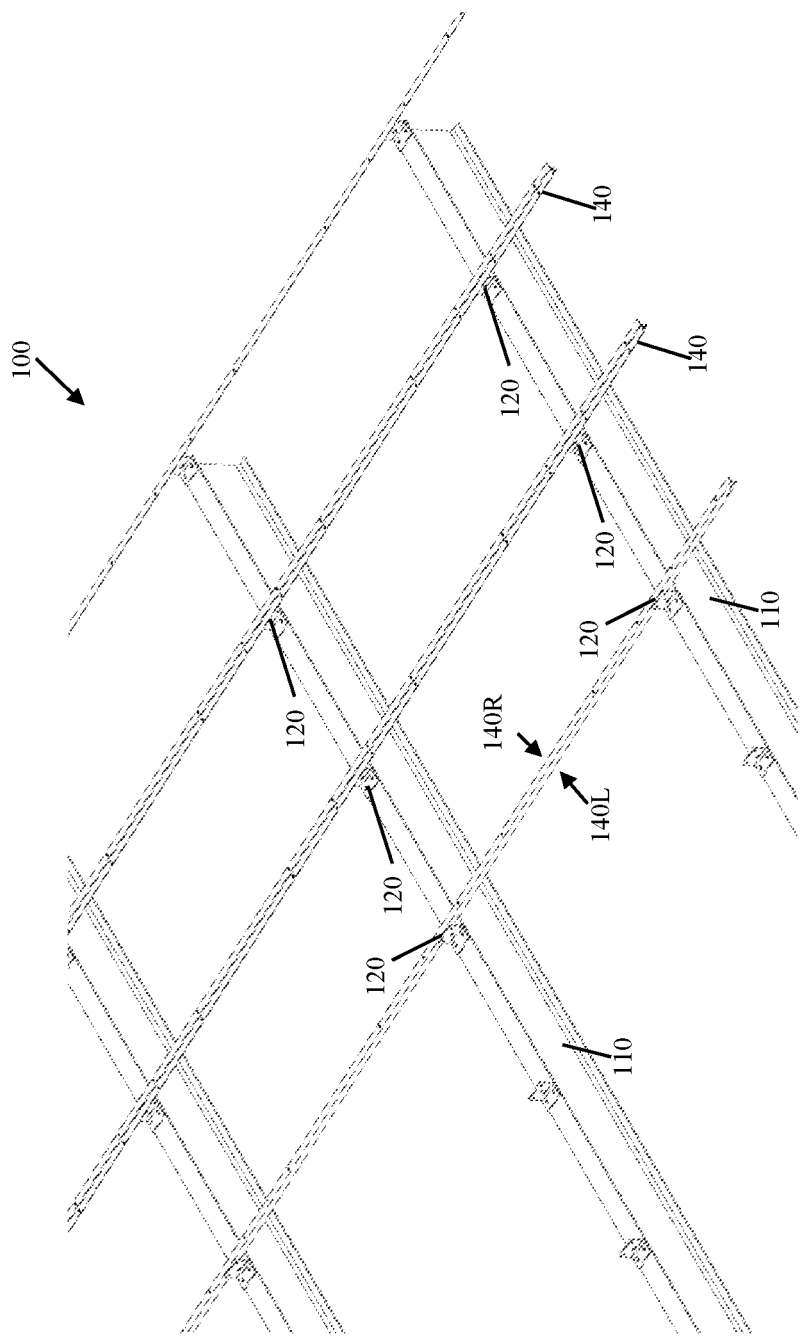
Figure 6:
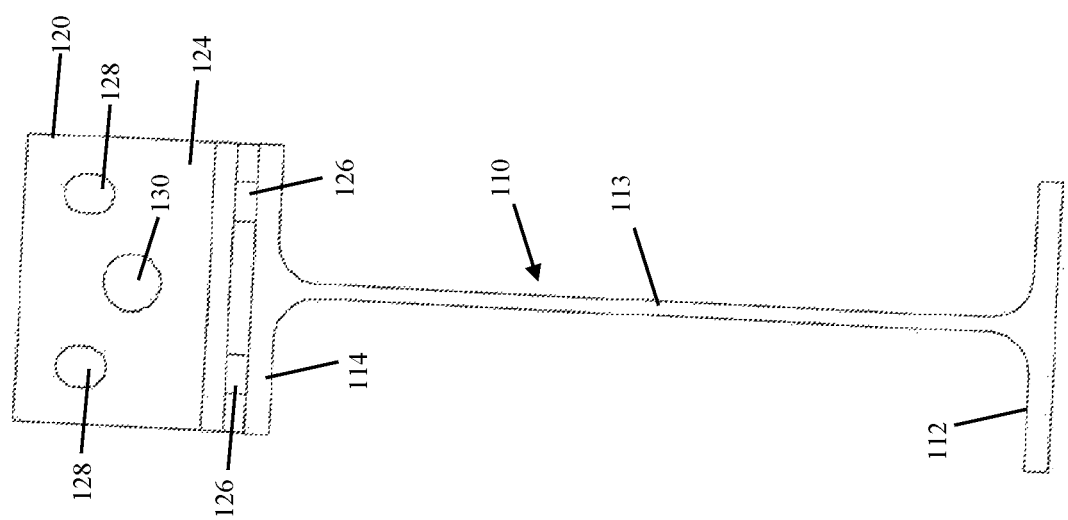
FIG. 6 is a cross-sectional view of structural purlin with a rail mounting clip thereon according to embodiments of the disclosure.
Figure 7:
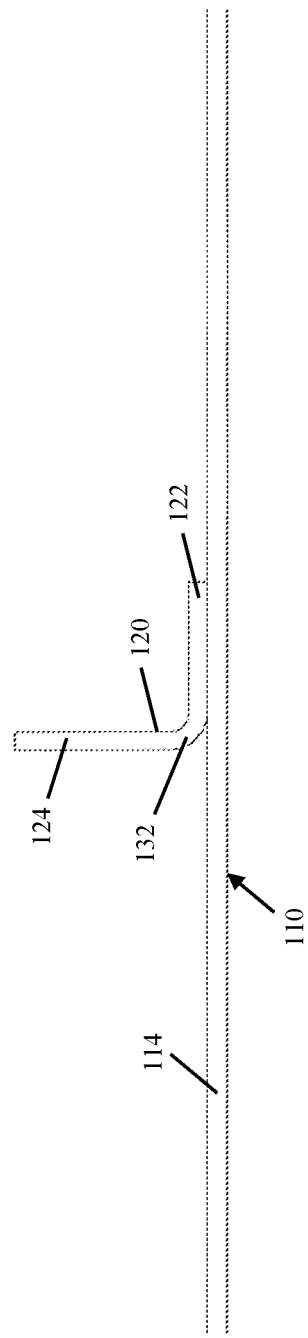
FIG. 7 is an expanded side view of a rail mounting clip on a structural purlin of a single slope canopy according to embodiments of the disclosure.

As shown in FIGS. 4-6, the single slope canopy 100 may be configured for mounting of photovoltaic panels 150 via structural purlins 110. When viewed directly, the photovoltaic panels 150 may, in conjunction with each other and with beams 190 and column 180, form any of various shapes or structural configurations. Single slope canopy 100 may include at least one column 180 arranged vertically with a first end coupled to a lower surface (e.g., ground) and a second end supporting beams 190. Each column 180 may protrude upwards from the lower surface to beam 190, thus having a predetermined height. In various implementations, the height of column 180 may range from about 10 feet to about 18 feet, e.g., so as to provide sufficient clearance for vehicles or other persons, items, etc., beneath single slope canopy 100.

Figure 14:
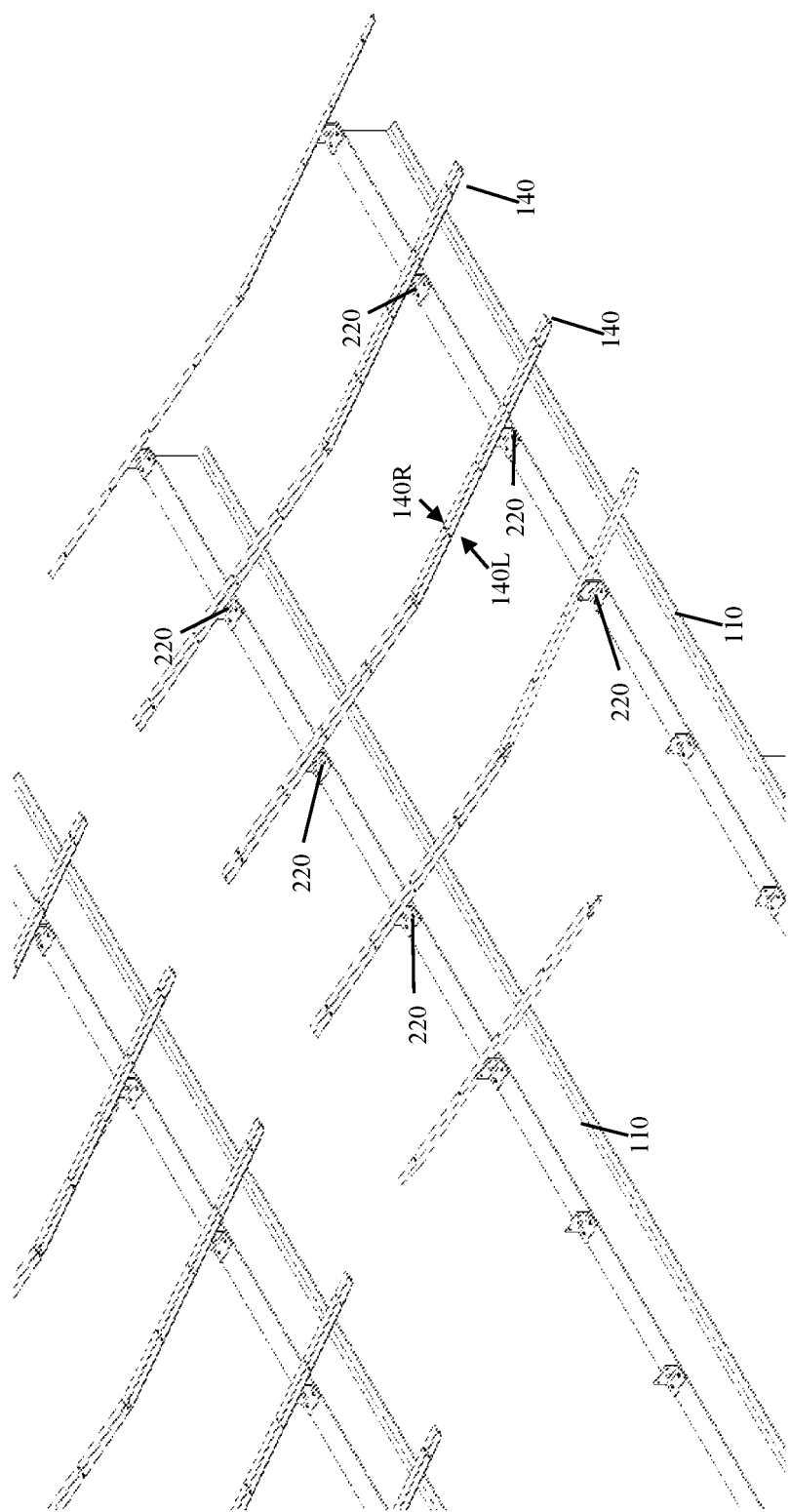
FIG. 14 is a partial perspective view of a dual slope canopy without photovoltaic panels attached according to embodiments of the disclosure.
Figure 15:
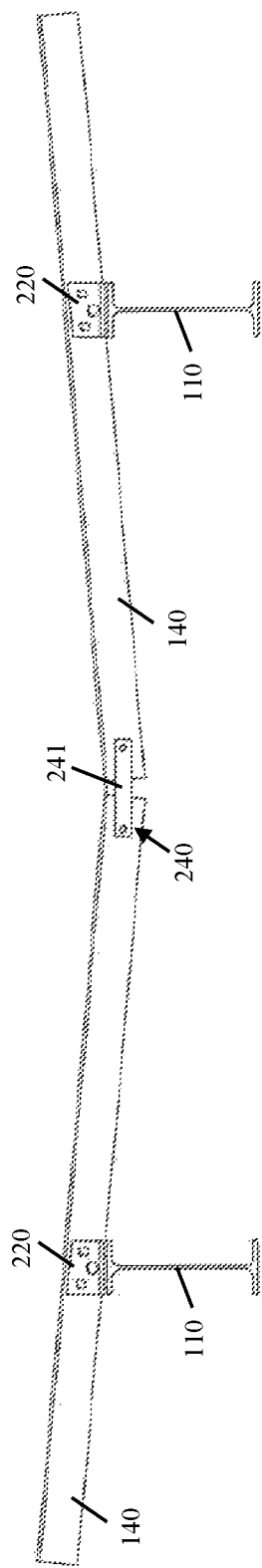
FIG. 15 is a partial side view of a dual slope canopy according to embodiments of the disclosure.
Figure 16:
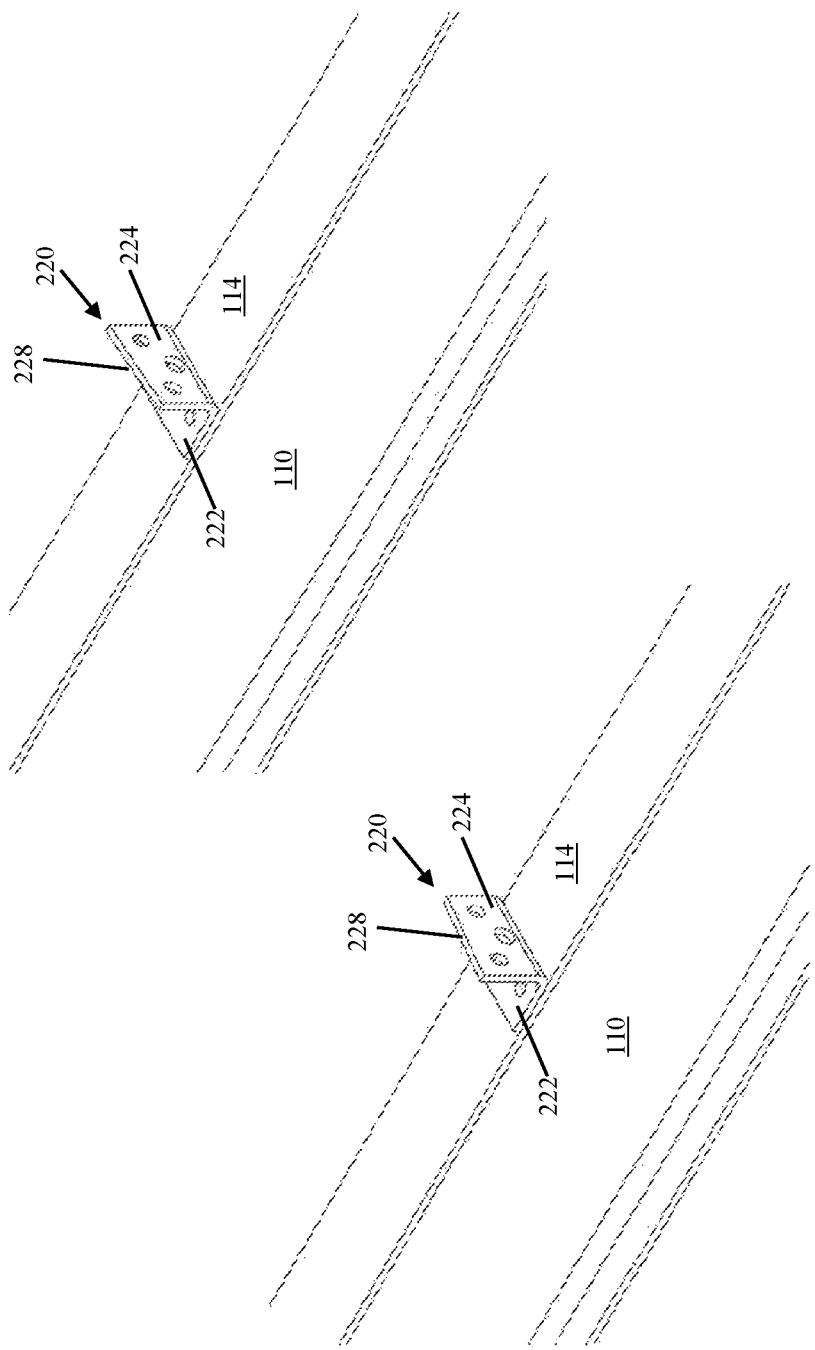
FIG. 16 is an expanded perspective view of a rail mounting clip on a structural purlin of a dual slope canopy according to embodiments of the disclosure.

Each beam 190 defines part of a raised support structure above which photovoltaic panels 150 may be mounted. Structural purlins 110 on beam(s) 190 in turn may include legs 112, 114 disposed between a web. Structural purlins 110 may be spaced apart from each other and apart from other structural purlins 110, and over beams 190, for direct and/or indirect coupling of the plurality of photovoltaic panels 150 to various rail assemblies 140. Structural purlin 110, rail assemblies 140, and rail mounting clip 120 span a predetermined area between columns 180 and/or beams 190 to allow an array of photovoltaic panels 150 to be mounted on structural purlin 110. Rail assembly 140 can be formed from any material suitable for mounting and supporting of photovoltaic panel(s) 150 and may include a metallic material. For example, in some embodiments the rail assembly 140 is formed from structural steel. However, other metallic materials now known or hereinafter developed (including, e.g., pure metals, alloys, or composite materials) may be used to form rail assembly 140. In a particular, non-limiting aspect of the rail assembly 140, the rail assembly 140 may include a hot-rolled structural steel angle shape with parallel rails 140L, 140R (FIG. 14). Illustrative and non-limiting dimensions of the parallel rails 140L, 140R of the rail assembly 140 are in a range between about 1.5 inch and about 5.0 inch (37 mm - 127 mm). In some cases, rail assembly 140 may be formed as a hot-rolled structural steel angle. In another aspect of the embodiments, the rail assembly may be formed as a folded shape from sheet metal, with the sheet metal being provided with a thickness in a range between about 0.097 inch (2.5 mm) (12-gauge steel) and about 0.25 inch (6.3 mm). Parallel rails 140L, 140R, can be symmetrical or non-symmetrical. In either case, parallel rails 140L, 140R of rail assembly 140 may have any desired length, e.g., in a range between about 0.18 inch and about 0.25 inch (4.5 mm - 6.5 mm).

Rail assembly 140 may extend along a length (i.e., longer) edge of aluminum photovoltaic panel 150, e.g., along its frame. Photovoltaic panel(s) 150 may include a frame formed of a lightweight metallic material, commonly aluminum, although other metals are possible. Rail assembly 140 may include mounting features, e.g., slots or similar coupling components such as pre-punched holes, which may be arranged in a particular direction. Slots of rail assembly 140 may be oriented in an opposing direction from complementary components of photovoltaic panel(s) 150 for adjustability. Rail assembly 140 can be coupled to the frame of photovoltaic panel 150, for instance, via stainless steel hardware and may be bonded using washers for electrical equipment bonding (or WEEBs) or similar components.

A frame of photovoltaic panel 150 may be bonded and reinforced to rail assembly 140 to prevent deflection of the photovoltaic panel 150. The prevention of deflection avoids torsion of the photovoltaic panels 150 and degradation of the photovoltaic panel 150 performance due to the "microcracks" phenomenon. This structural reinforcement also enables use of thin-framed photovoltaic panel(s) 150 in higher loading regions where elevated wind, snow, and seismic forces may otherwise be problematic or prevent deployment altogether. Rail assembly(ies) 140 may be formed from structural steel at an angle as a folded shape from sheet metal which may be straight cut at its ends. In another aspect of the embodiments, the rail assembly 140 may be formed from structural steel in an ornamental shape. In another aspect of the embodiments, the rail assembly 140 may be angle cut or formed in an ornamental shape at its ends. Rail assembly 140 may be finished with at least one of hot dipped galvanized, powder-coated, and painted or combinations thereof. Other aspects of single slope canopy 100 may include rail assembly 140 being connected to a single structural purlin 110 via rail mounting clip 120. Rail mounting clip 120 can be formed of a metallic material. An aspect of the disclosure includes the rail mounting clip 120 being formed from a cost-effective steel angle or bent plate. The rail mounting clip 120 may be provided from material with thicknesses in a range between about 0.25 inch and 0.5 inch (6 mm-12.7 mm).

Figure 8:
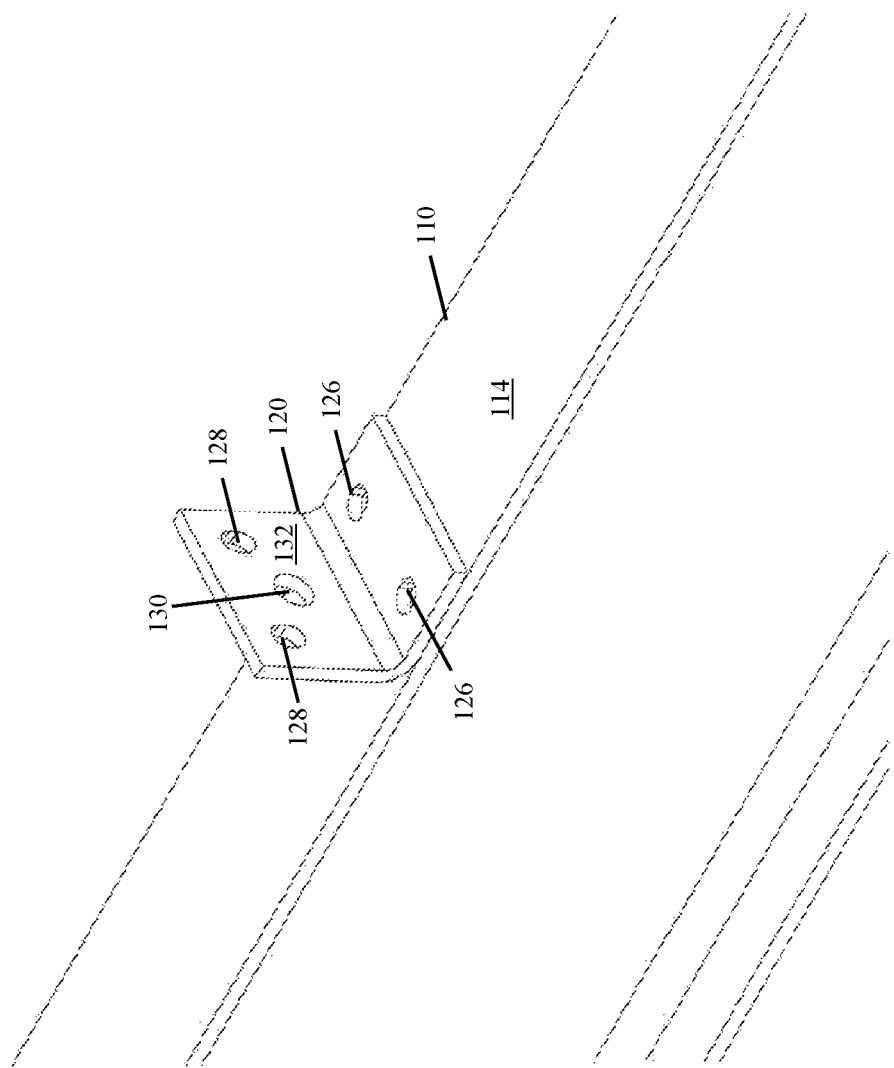
FIG. 8 is a perspective view of a rail mounting clip on a structural purlin in a single slope canopy according to embodiments of the disclosure.
Figure 9:
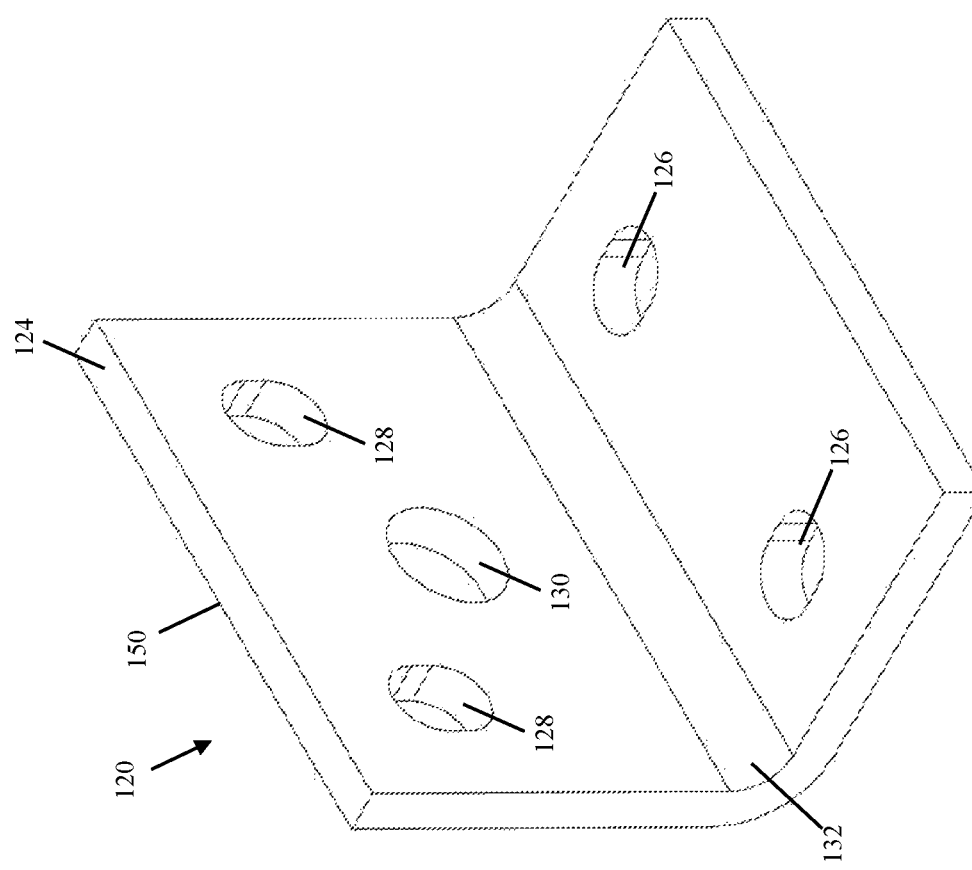
FIG. 9 is an expanded perspective view of a rail mounting clip according to embodiments of the disclosure.
Figure 10:
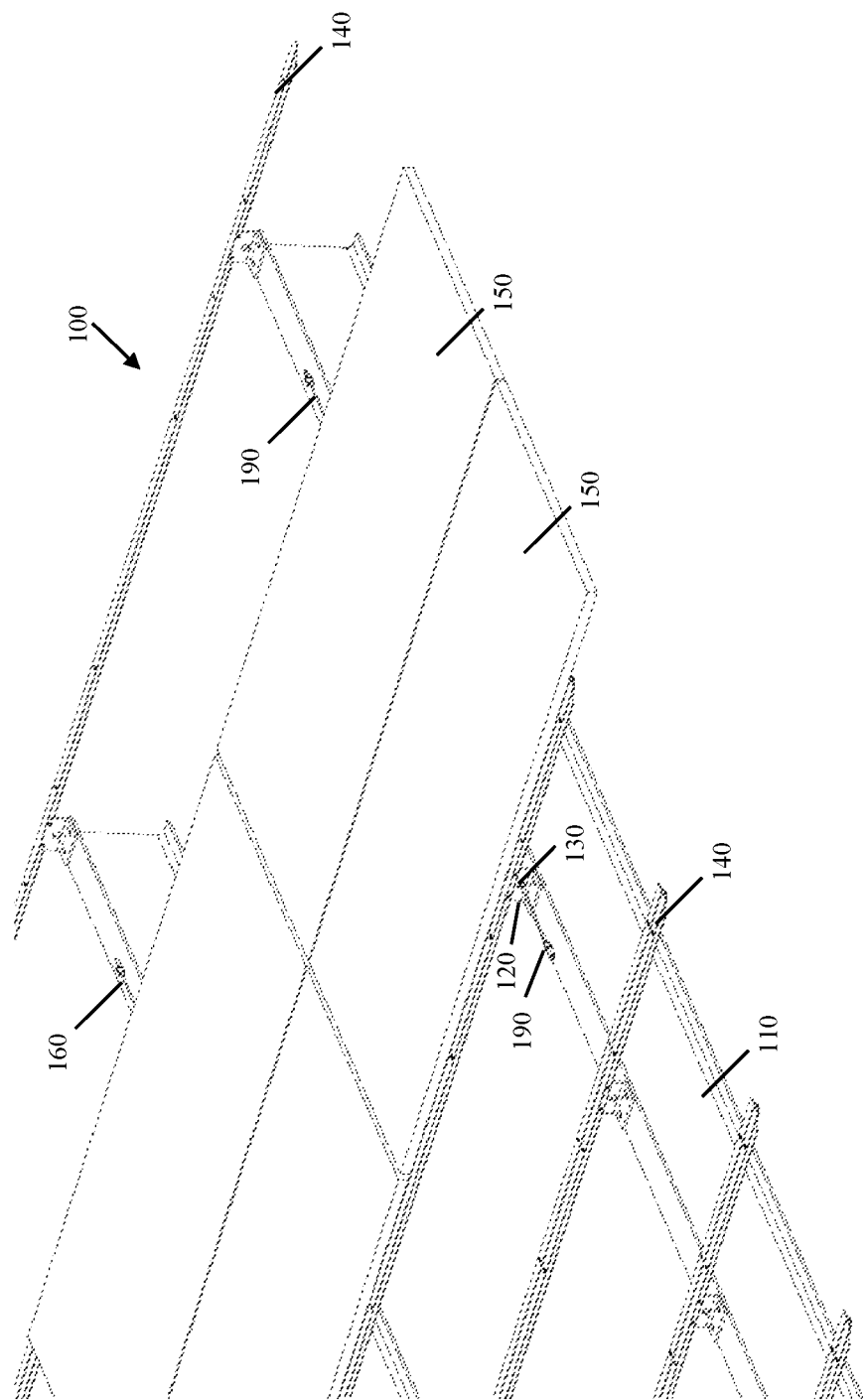
FIG. 10 is an expanded perspective view of a single slope canopy and wire router according to embodiments of the disclosure.

As further shown in FIGS. 8-10, in some embodiments the rail mounting clip 120 may include a first segment 122 and a second segment 124. First segment 122 may include one or more holes 126 that enable coupling the rail mounting clip 120 to a respective structural purlin 110. Second segment 124 may include one or more slots 128 that enable coupling the rail mounting clip 120 to a rail assembly 140, such that the one or more slots 128 enable coupling the photovoltaic panel 150 at a desired angle of inclination. In some embodiments, second segment 124 may further include a hole 130 (FIG. 20) configured received electrical components (e.g., wires, connectors, etc.) therethrough, thereby providing a wire router for single slope canopy 100. In some cases, hole 130 has a diameter in a range between about 1.0 inch and about 1.5 inch (25 mm-38 mm), however other diameters for hole 130 are contemplated within the scope of this disclosure. Hole 130 therefore enables routing one or more electrical components for the single slope canopy 100, which may be particularly useful with photovoltaic panels 150 having junction boxes, wires, etc., that are centrally positioned along a lengthwise side of photovoltaic panel 150. As shown in FIG. 10, for example, hole 130 may act as a wire router for passing one or more wires 160 for operating photovoltaic panel(s) 150 through rail mounting clip(s) 120. Wire 160 may be embodied as any currently known or later developed electrical transmission line for transmitting and/or receiving electrical energy for photovoltaic panel(s) 150 in the form of power connections, signals, etc., allowing photovoltaic panel(s) 150 to operate. Hole 130 thus may allow wires 160 to pass freely through certain components of canopy 100 without being obstructed or blocked by any of its components.

Rail mounting clip 120 can be configured to create a gap between photovoltaic panels 150. The gap can accommodate thermal expansion of photovoltaic panels 150 under varying conditions. Rail mounting clip 120 might be modified in dimension, such as by being coped or cut at an angle, if desired, to prevent photovoltaic panel(s) 150 from fouling or resting on the upper surface of second segment 124 of the rail mounting clip 120. In a further aspect of the embodiment, rail assembly 140 and rail mounting clip 120 can be preassembled (FIG. 19) and finished off site. In further implementations, rail assembly 140 and rail mounting clip 120 can support photovoltaic panels 150 at an incline, even in extreme wind, snow, and seismic loading conditions. In some cases, structural purlin(s) 110 spanning between beams 190 can be installed horizontally on a portion of the single slope canopy 100. In other cases, structural purlin(s) 110 can be installed at a slight incline to follow an average grade on surface lot of the single slope canopy 100. In other cases, structural purlin(s) 110 can be installed on a building. Structural purlin 110 may include or be embodied as, e.g., a wide-flange beam, built-up member, a composite beam, hollow structural sections (HSS) tube steel, or similar shape purlin, having any desired length. In some cases, structural purlin 110 may include a length in a range between about 6.0 inch and about 18.0 inch (152 mm-457 mm). In other cases, structural purlin 110 may include a length in a range between about 25.0 feet and 60.0 feet (7.5 m-18 m).

Figure 11:
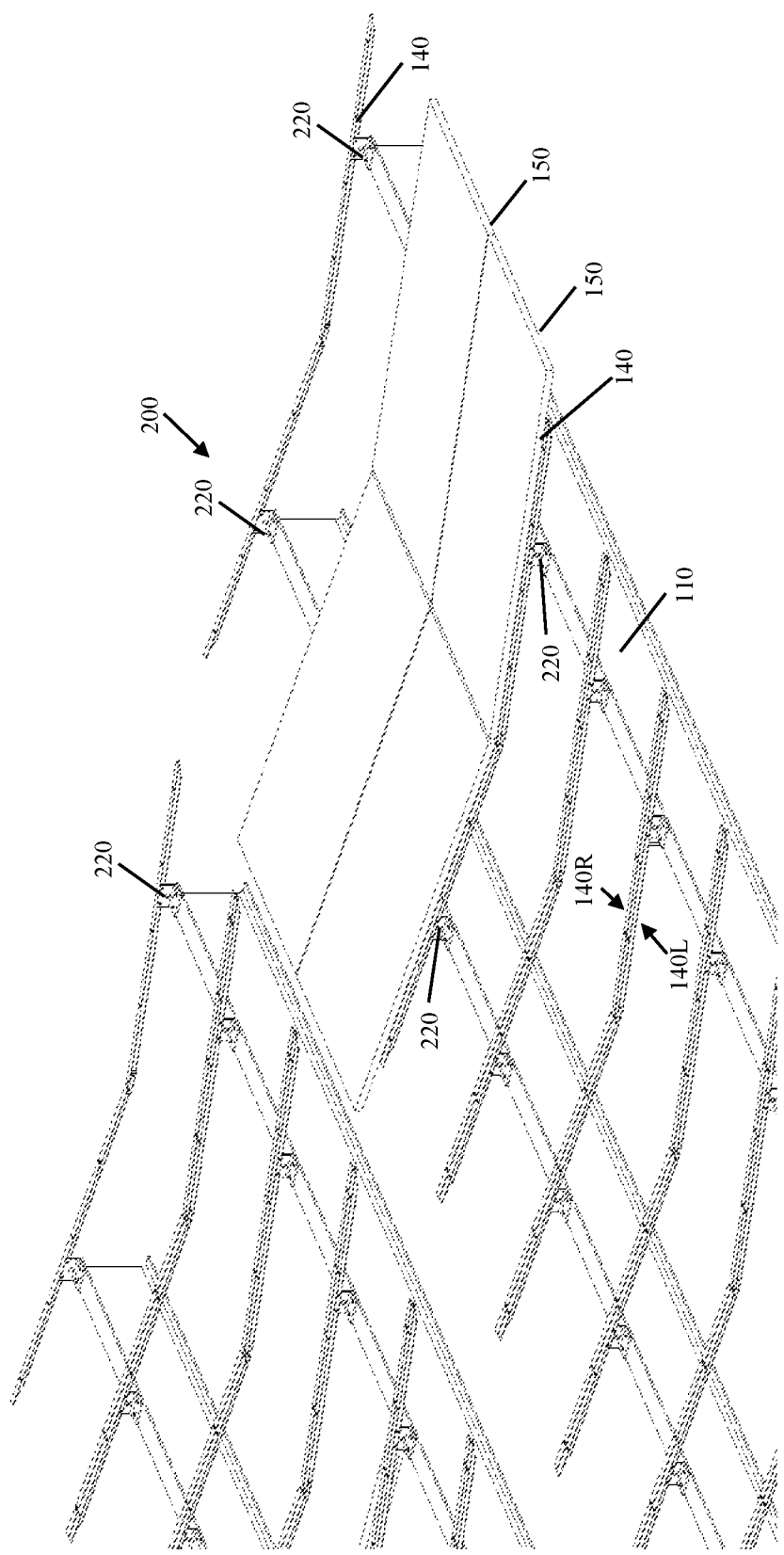
FIG. 11 is a perspective view of a dual slope canopy according to embodiments of the disclosure.

As illustrated in FIG. 5, in some embodiments the rail assembly 140 may include two parallel rails—rail 140L (left) and rail 140R (right)—such that each rail 140L, 140R may be mounted by rail mounting clip 120 to separate structural purlins 110. Rail mounting clip 120 includes a straight top edge configured to complement the incline of rails 140L, 140R. As illustrated in FIG. 6, rails 140L, 140R are mounted with a space therebetween, such that rail mounting clip 120 is mounted on structural purlin 110 between rails 140L, 140R. Each rail 140L, 140R includes holes 130 that align with slots 128 of rail mounting clip 120. Accordingly, in an aspect of the embodiments, holes 126 align to holes in a respective single structural purlin 110 to coupling each rail mounting clip 120 to corresponding structural purlin(s) 110. Turning now to FIGS. 11-20, embodiments of the disclosure further include a dual slope canopy 200 in which a rail mounting clip 220 connects photovoltaic panel(s) 150 to a structural purlin 110 that spans further between support beams or rafters 180, according to embodiments of the disclosure will be described. FIG. 11 illustrates an isometric view of one embodiment of dual slope canopy 200 with rail mounting clip 220 connecting photovoltaic panel(s) 150 of an array to structural purlin(s) 110 spanning between support beams or rafters 180 (FIGS. 12-15). Dual slope canopy 200 may be installed and/or built on a parking area, by way of example, and configured to shield one or more vehicles (not shown) and simultaneously generate electric power using sunlight.

Figure 12:
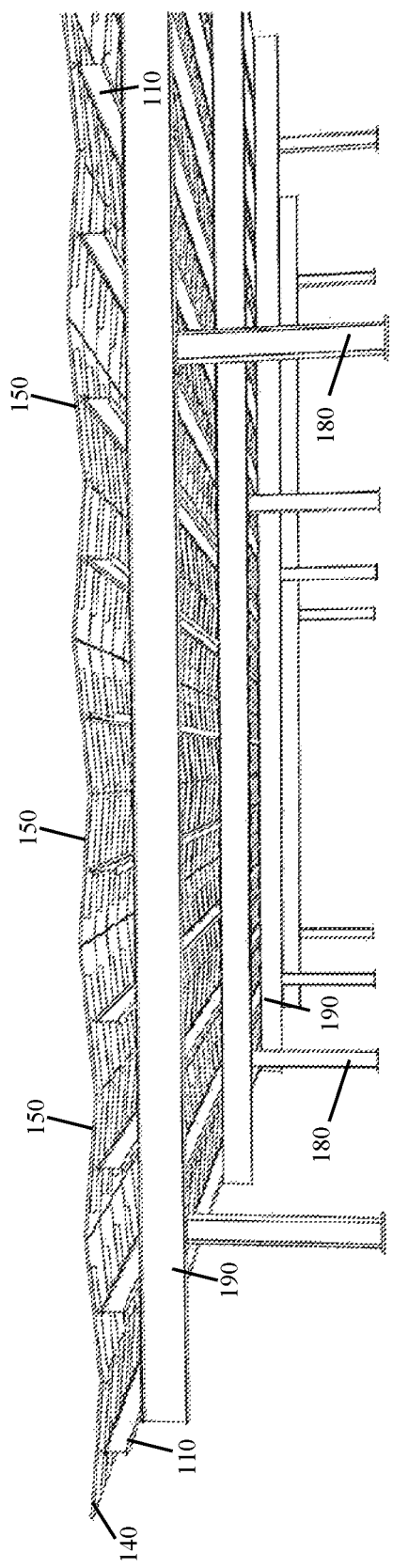
FIG. 12 is a side perspective view of a dual slope canopy according to embodiments of the disclosure.
Figure 13:
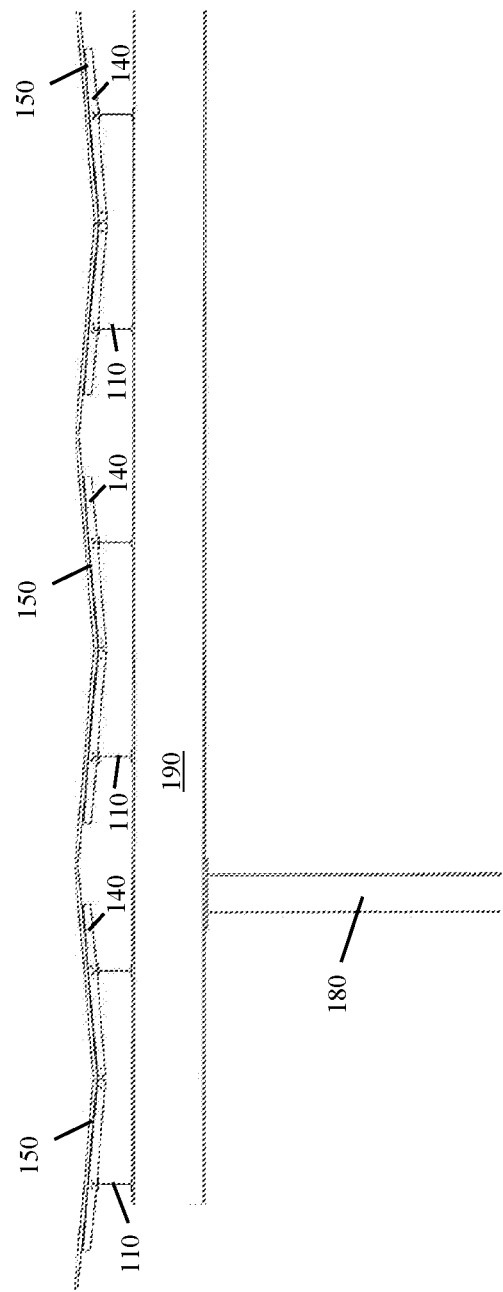
FIG. 13 is a partial side view of a dual slope canopy according to embodiments of the disclosure.

As shown by FIGS. 11-13, dual slope canopy 200 may include or be used together with photovoltaic panels 150 supported by pairs of structural purlins 110, which in turn are on beam(s) 190 supported by a column 180. When viewed directly, photovoltaic panels 150 may, in conjunction with each other and with beams 190 and column 180, form any shape advantageous in collecting solar energy and directing water to a water management system. Such shapes may include, by way of example, mirrored angling of respective ones of the photovoltaic panels 150 to form "V" shapes with regard to immediately adjacent photovoltaic panels 150; "W" shapes with regard to sets of four immediately adjacent interior photovoltaic panels 150; and a "W-T" or "V-T" shape formed by adjacent ones of the photovoltaic panels 150 (the "V" or the "W") atop the beams 190 and columns 180 (in combination, the "T").

Dual slope canopy 200 may include at least one column 180 arranged vertically with a first end coupled to a surface (e.g., ground) and a second end supporting beams 190. Each column 180 may extend upwards from the surface to beam 190. The length of column(s) 180 may be in a range from about 10 feet to about eighteen feet, by way of non-limiting example, so as to provide sufficient clearance for vehicles under the dual slope canopy 200. Each beam 190 may define part of a support structure on which panels 150 may be mounted. Pairs of structural purlins 110 may include legs 112, 114 disposed between a web. Purlins 110 may be spaced apart from each other and apart from other pairs of structural purlins 110 and may be disposed over beams 190 for direct or indirect coupling of the plurality of photovoltaic panels 150 to pairs of rail assemblies 140.

Structural purlin 110, pairs of rail assemblies 140, and rail mounting clip 220 connect photovoltaic panel(s) 150 to structural purlin 110. Structural purlin 110, pairs of rail assemblies 140, and rail mounting clip 220 span between support beams 180 as described herein with respect to FIGS. 11-12 and 16-20. Rail assembly 140 can be formed from a metallic material, e.g., structural steel or other materials described herein (including composite materials, alloys, etc.) In a particular, non-limiting aspect of the rail assembly 140, the rail assembly 140 may include a hot-rolled structural steel angle shape with parallel rails 140L, 140R (FIG. 14). Illustrative and non-limiting dimensions of the parallel rails 140L, 140R of the rail assembly 140 are in a range between about 1.5 inches and about 5 inches (37 mm - 127 mm). In a further aspect of the embodiments, parallel rails 140L. 140R can be symmetrical or non-symmetrical. Additionally, the thickness of parallel rails 140L, 140R of the rail assembly 140 may range between about 0.187 inch and about 0.250 inch (4.5 mm - 6.5 mm). Rail assembly 140 may be oriented along the lengthwise edge(s) of photovoltaic panel(s) 150 and/or the frame thereof. Generally, photovoltaic panel 150 frame(s) is/are formed of lightweight metallic materials, such as but not limited to, aluminum. Rail assembly 140 may connect to pre-punched holes or slots (not illustrated for ease of illustration), where the pre-punched holes or slots are disposed in an opposing direction for adjustability. Connections from rail assembly 140 to photovoltaic panel 150 can be provided, e.g., by using stainless steel hardware and bonded using Washers for Electrical Equipment Bonding (or WEEBs).

Where provided or applicable, the frame(s) of photovoltaic panel(s) 150 may be bonded and reinforced to rail assembly 140 to prevent deflection of the photovoltaic panel 150. Preventing deflection avoids torsion and/or degradation of photovoltaic panels 150 that would otherwise occur from the "micro-cracks" phenomenon. Structural reinforcement enables use of a thinner frame photovoltaic panels 150 in higher loading regions where elevated wind, snow, and seismic forces may otherwise hamper or prevent deployment of such panels. Rail assembly 140 formed from structural steel angle or folded angle from sheet metal may be straight cut at its longitudinal ends. In another aspect of the embodiments, rail assembly(ies) 140 formed from structural steel may be formed in an ornamental shape. In another aspect of the embodiments, rail assembly 140 may be angle cut or formed in an ornamental shape at its ends. Rail assembly 140 may include various finishing materials such as, e.g., hot dipped galvanized coatings, powder coatings, paints and/or combinations thereof.

Figure 18:
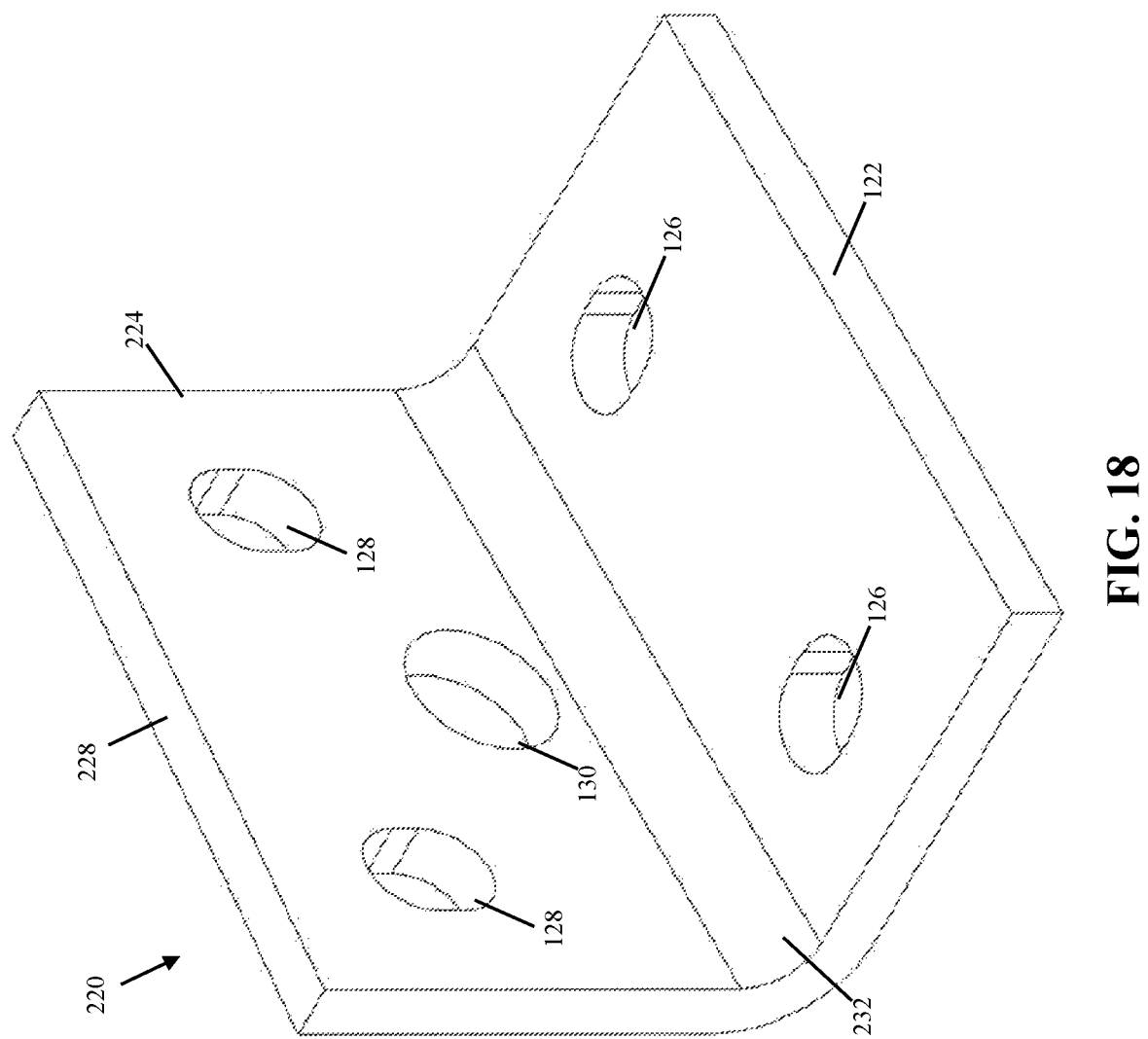
FIG. 18 is close up view of a rail mounting clip for a dual slope canopy according to embodiments of the disclosure.
Figure 20:
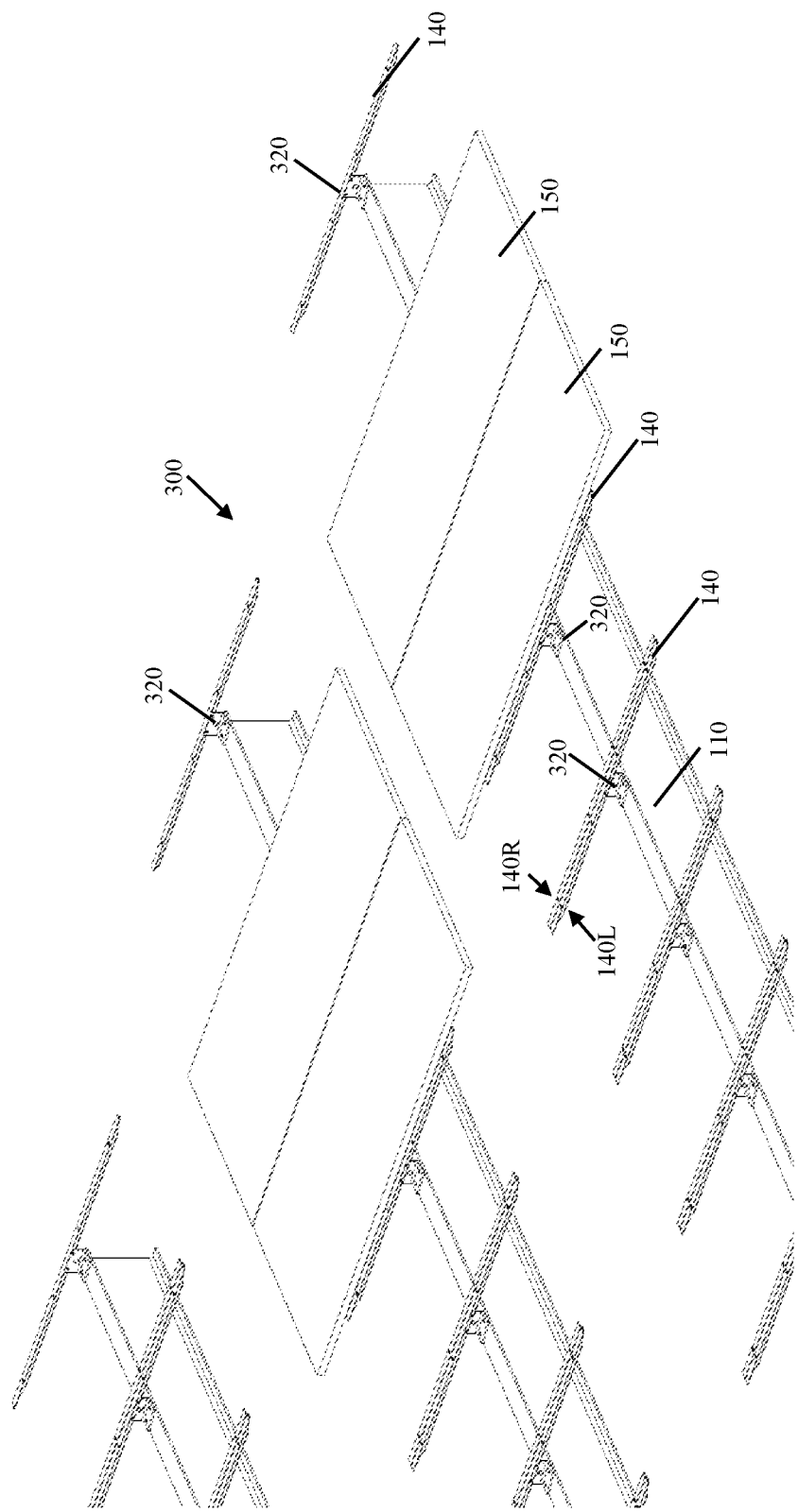
FIG. 20 is an overhead perspective view of a louvered canopy according to embodiments of the disclosure.
Figure 21:
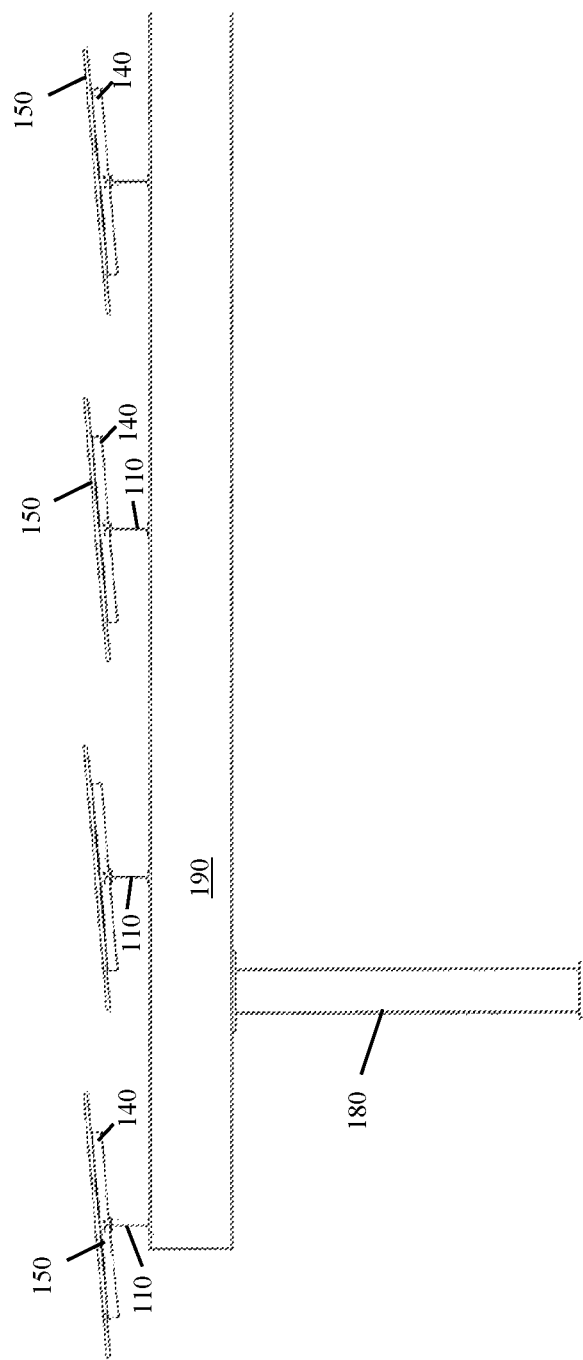
FIG. 21 is a partial side view of a louvered canopy according to embodiments of the disclosure.
Figure 22:
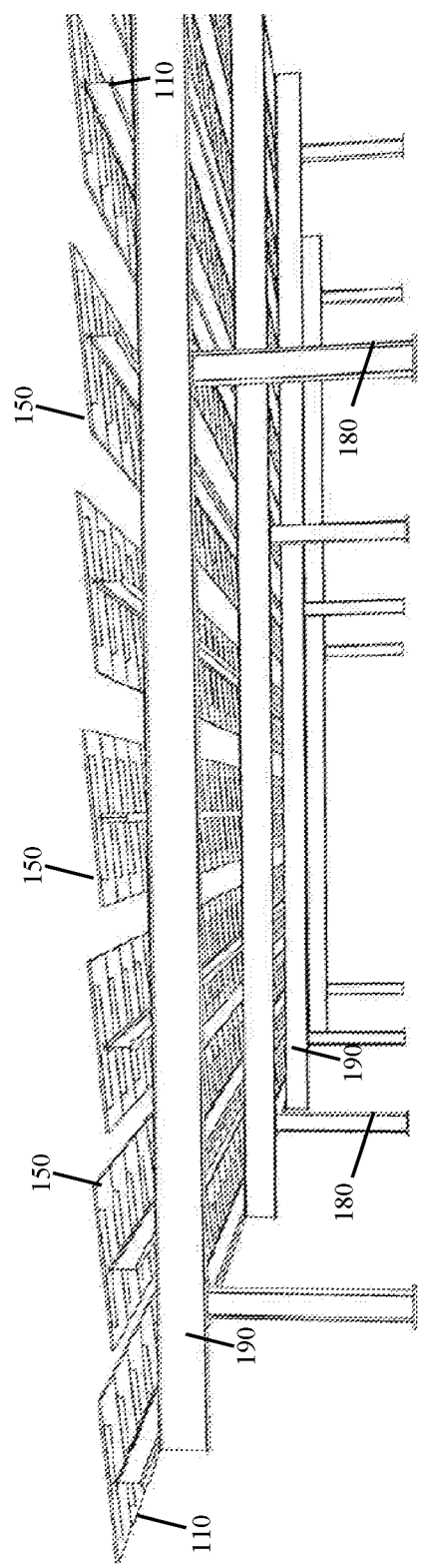
FIG. 22 is a side perspective view of a louvered canopy according to embodiments of the disclosure.
Figure 23:
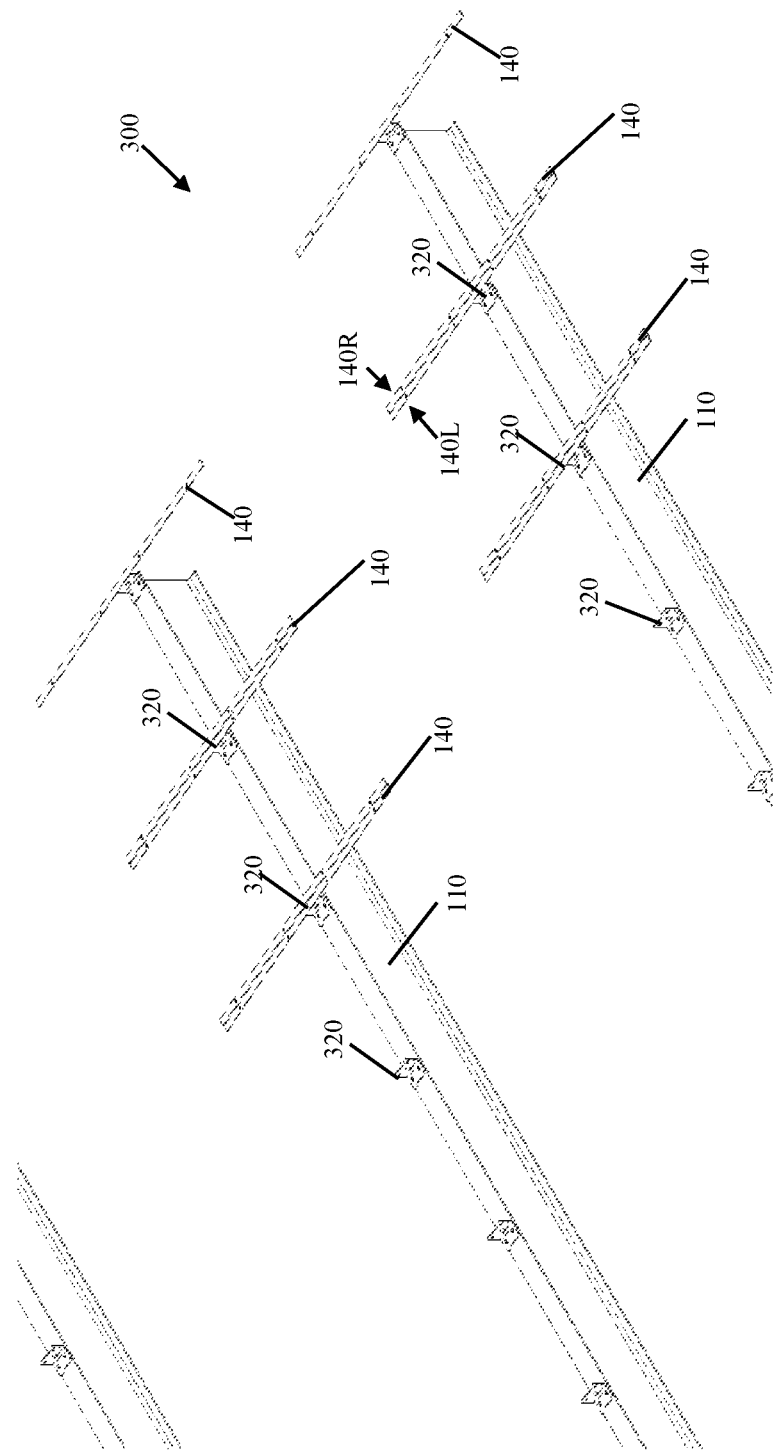
FIG. 23 is an overhead perspective view of a louvered canopy without photovoltaic panels attached according to embodiments of the disclosure.
Figure 24:
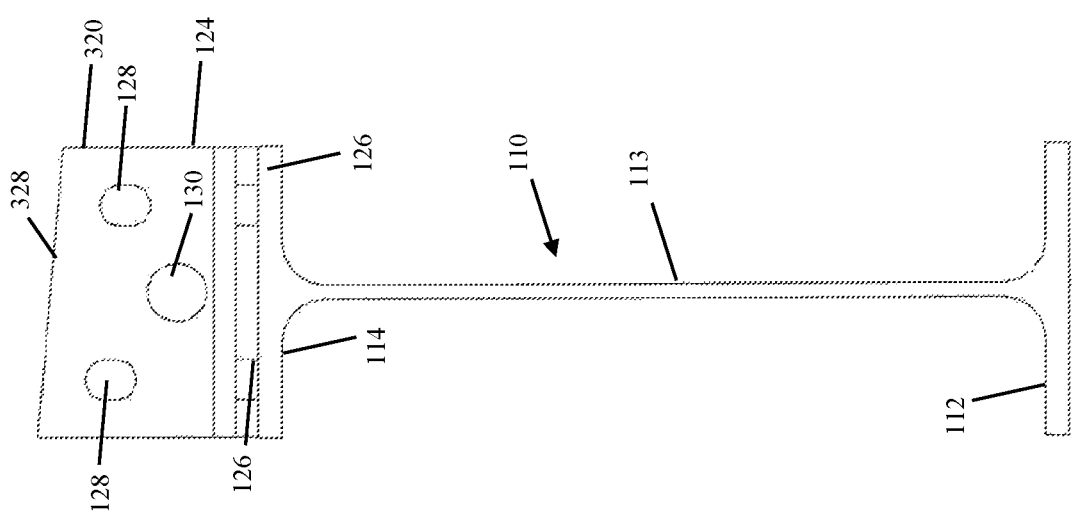
FIG. 24 is a cross-sectional view of a structural purlin and rail mounting clip for a louvered canopy according to embodiments of the disclosure.
Figure 25:
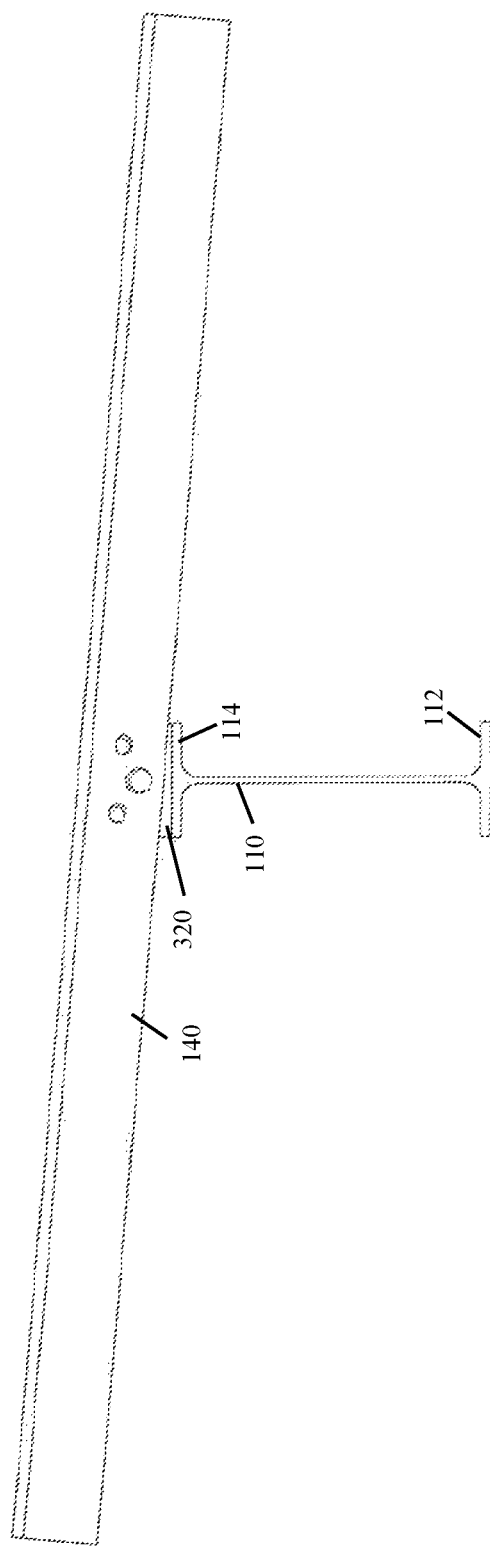
FIG. 25 is an expanded side view of a rail mounting clip on a structural purlin of a louvered canopy according to embodiments of the disclosure.

Rail assemblies 140 may be arranged in pairs, and optionally joined by a flat bar with holes having the same thickness as rail mounting clip 120 to provide dual slope canopy 200. Other aspects of the dual-sloping canopy 200 in accordance with aspects of the embodiments may include rail assembly 140 being connected to one structural purlin 110 via rail mounting clip(s) 220 in the form of a bracket. Rail mounting clip 220 nonetheless can be formed of a metallic material. Thus, rail mounting clip 220 may be formed from a cost-effective steel angle or bent plate. Rail mounting clip 220 may be provided from material with thicknesses in a range between about 0.25 inch and 0.50 inch (6 mm - 12.7 mm). Accordingly, rail mounting clip 220 may include a first segment 222 (e.g., extending horizontally) and a second segment 224 (e.g., extending vertically or otherwise perpendicularly from first segment 222) as shown in FIGS. 18 and 20. Rail mounting clip 220 may include holes 126 to connect rail mounting clip(s) 220 to corresponding single structural purlin(s) 110. Rail mounting clip 220 may include offset holes or slots 128 enabling rail mounting clip 220 at second segment 224 to connect to a rail assembly 140. Offset holes or slots 128 in the second segment 224 create a desired angle of inclination for the photovoltaic panel 150.

Rail mounting clip(s) 220 may include a wire router in the form of a hole 130 (FIG. 20) or similar feature for passing wires through dual slope canopy 200. Hole 130, where included, may be sized to accommodate wiring and connectors from canopy 200. For example, a non-limiting size for hole 130 is in a range between about 1.0 inch and 1.5 inch (25 mm-38 mm). Hole 130 for rail mounting clip 220 may organize and improve wire management, particularly with photovoltaic panels 150 whose junction boxes and wires are positioned in a center of a long side of the photovoltaic panel 150. In another aspect of the embodiments, rail mounting clip 220 is structured to provide a gap between photovoltaic panels 150. The gap can accommodate thermal expansion of panels 150 under varying conditions. Rail mounting clip 220 might be modified in dimension, such as by being coped or cut at an angle, if necessary, to prevent a photovoltaic panel 150 from resting on an angle top edge 228 of second segment 224 of rail mounting clip 220. In a further aspect, rail assembly(ies) 140 and rail mounting clip 220 can be preassembled (FIG. 19) and finished off site.

In an additional aspect of the embodiments, rail assembly 140 and rail mounting clip 220 can support photovoltaic panels 150 at an incline, even in extreme wind, snow, and seismic loading conditions. Further, a single structural purlin 140 spanning between beams 190 can be installed horizontally of a portion of dual slope canopy 200. A further aspect of the embodiments enables a single structural purlin 110 spanning between beams 190 to be installed at a slight incline to maintain a desired grade on surface lot of the dual slope canopy 200. Moreover, a still further aspect of the embodiments includes a single structural purlin 110 spanning between beams 190 that can be installed on a building. Structural purlin 110 may include a wide-flange beam, built-up member, a composite beam, HSS tube steel, or similar shape purlin. As per certain aspects of the embodiment, structural purlin 110 can be provided with a length in a size range between about six inches and about eighteen inches (152 mm-457 mm) or greater, and the structural purlin 110 can span greater distances in a range between about twenty-five feet and sixty feet (7.5 m-18 m) or more.

Figure 17:
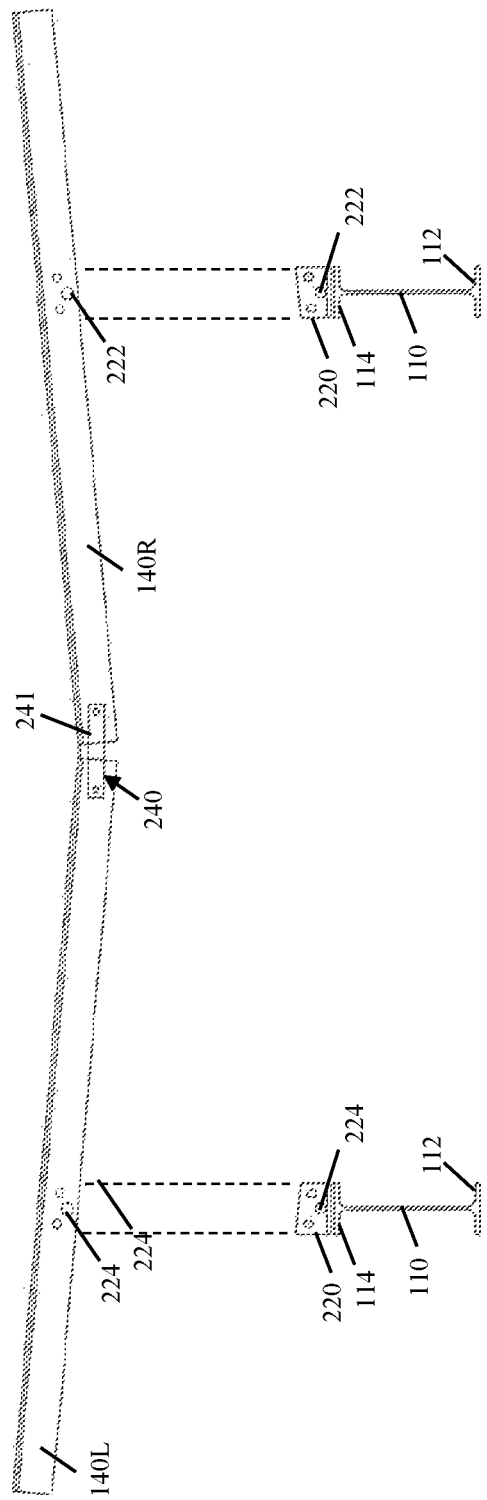
FIG. 17 is a partial side separated view of a dual slope canopy according to embodiments of the disclosure.
Figure 19:
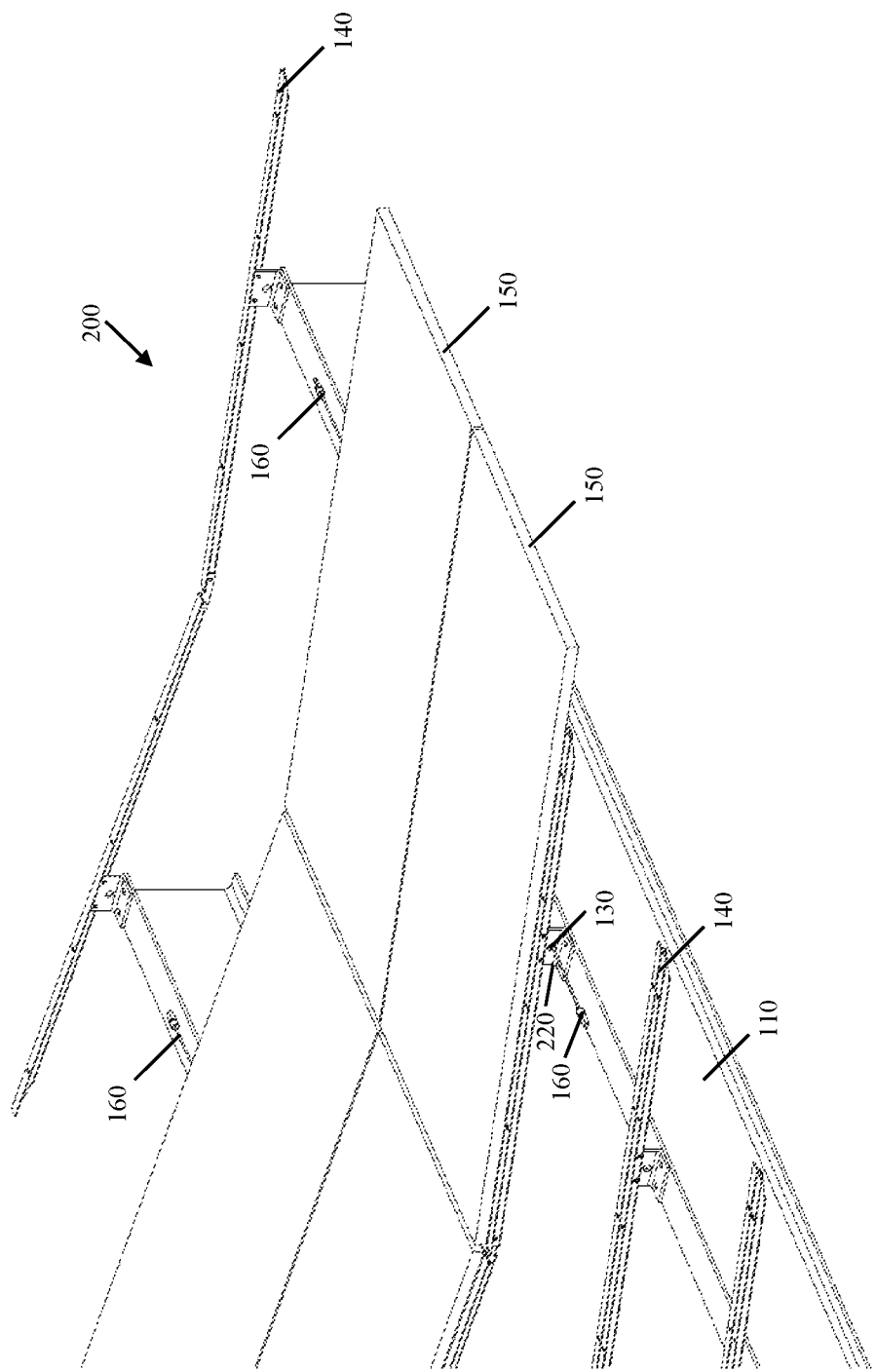
FIG. 19 is an expanded perspective view of a dual slope canopy and wire router according to embodiments of the disclosure.

Referring to FIGS. 17-19, in a dual slope configuration, two parallel rails 140L, 140R are mounted by rail mounting clip 220 to separate structural purlins 110. Rails 140L, 140R meet at a low point 240. A connector 241 (also known as a strap, fastener, coupling component, etc.) may physically connect rails 140L, 140R at low point 240. Rail mounting clip 220 may include an angled top edge 228 to correspond with the incline of rails 140L, 140R so rails 140L, 140R meet at low point 240 (see FIG. 18). In addition, as shown in FIG. 19 and discussed elsewhere herein, hole 130 of rail mounting clip 220 may act as a wire router for passing one or more wires 160 for operating photovoltaic panel(s) 150 through rail mounting clip(s) 220. Wire 160 may be embodied as any currently known or later developed electrical transmission line for transmitting and/or receiving electrical energy for photovoltaic panel(s) 150 in the form of power connections, signals, etc., allowing photovoltaic panel(s) 150 to operate. Hole 130 thus may allow wires 160 to pass freely through certain components of canopy 200 without being obstructed or blocked by any of its components.

Referring to FIGS. 20-29, a louvered or single row canopy (simply "louvered canopy" hereafter) 300 according to the disclosure may include rail mounting clip(s) 320 for connecting photovoltaic panel(s) 150 to structural purlin(s) 110 similar to other embodiments herein. Structural purlin 110 may span between beams 180 (FIGS. 12-15) as discussed herein. Louvered canopy 300 may be installed and/or built on a parking area, by way of example, and may shield one or more vehicles (not shown) while also generating electric power using sunlight. Referring to FIGS. 20-29 and FIGS. 22-25 in particular, louvered canopy 300 includes photovoltaic panels, supported by pairs of structural purlins 110, on beam 190 supported by a column 180. When viewed directly, the photovoltaic panels 150 may, in conjunction with each other and with beams 190 and column 180, form any of various shapes advantageous in collecting solar energy. Such shapes may include, by way of example, mirrored angling of respective ones of the photovoltaic panels 150 to form a louvered configuration with regard to immediately adjacent photovoltaic panels 150.

Louvered canopy 300 may include column(s) 180 arranged vertically with a first end over a lower surface (e.g., ground) and a second end supporting beam(s) 190. Each column 180 may have a length protruding upwards from the lower surface to beam 190. The length may be between about ten feet to about eighteen feet, by way of non-limiting example, so as to provide sufficient clearance for vehicles under louvered canopy 300. Each beam 190 may define part of a horizontal supporting structure above which photovoltaic panels 150 may be mounted. Pairs of structural purlins 110 include legs 112, 114 disposed between a web. Purlins 110 may be spaced apart from each other and apart from other pairs of structural purlins 110, thus being disposed over beams 190 for direct or indirect coupling of the plurality of photovoltaic panels 150 to pairs of rail assemblies 140. Structural purlin 110, pairs of rail assemblies 140, and rail mounting clip 220 may enable mounting of photovoltaic panel(s) 150 as an array. Structural purlin 110, pairs of rail assemblies 140, and rail mounting clip 320, together provide coupling components spanning between beams 180.

Rail assembly 140, in accordance with an aspect of the embodiments, can be formed from a metallic material, e.g., from structural steel or other materials discussed herein such as alloys, non-metals, and/or composite materials. Single structural purlin 110 in some cases may include a hot-rolled structural steel angle shape with legs 112 and 114 (FIGS. 24-28). Illustrative and non-limiting dimensions of the legs 112 and 114 of the single structural purlin 110 are in a range between about 1.5 inches and about 5 inches (37 mm-127 mm). In Legs 112 and 114 can be symmetrical or non-symmetrical. An illustrative thickness of the legs 112 and 114 of the single structural purlin 110 is in a range between about 0.18 inch and about 0.25 inch (4.5 mm-6.5 mm).

Rail assembly 140 may extend and/or be oriented along a lengthwise (i.e., longer) edge of photovoltaic panel 150 at its frame. Generally, the frame of photovoltaic panel 150 may include a lightweight metallic material, such as but not limited to, aluminum. Rail assembly 140 may connect to pre-punched holes or slots (not illustrated for ease of illustration), where the pre-punched holes or slots are oriented in an opposing direction for adjustability. The mounting of photovoltaic panel(s) 150 on rail assembly 140 may include, e.g., using stainless steel hardware and/or using Washers for Electrical Equipment Bonding (or WEEBs), or similar combinations of materials. Thus, in accordance with aspects of the disclosure, photovoltaic panel 150 frame(s) can be bonded and/or reinforced to rail assembly 140 to prevent deflection, degradation and/or torsion of the photovoltaic panel 150 due to the "micro-cracks" phenomenon. Structural reinforcement also enables thin-frame photovoltaic panel(s) 150 to be used in higher loading regions where elevated wind, snow, and seismic forces may otherwise be problematic or prevent deployment altogether.

Rail assembly 140 can be structured to have an angle or folded angle and may be formed from sheet metal but straight cut at its ends. In some cases, rail assembly 140 may be formed from structural steel angle and may be formed in an ornamental shape. Rail assembly 140 may be angle cut or formed in an ornamental shape at its ends. Rail assembly may have one or more of a hot dipped galvanized finish, a powder-coated finish, a painted finish, and/or combinations thereof. Other aspects of the louvered canopy 300 in accordance with aspects of the embodiments, include rail assembly 140 being connected to a single structural purlin 110 via a rail mounting clip 320. Rail mounting clip 320 can be formed of a metallic material. Aspects of the disclosure include rail mounting clip 320 formed from a cost-effective steel angle or bent plate. Rail mounting clip 320 may be provided from material with thicknesses in a range between about 0.25 inch and 0.50 inch (6 mm-12.7 mm).

As with other embodiments, rail mounting clip 320 may include a first segment 222 and an upstanding or second segment 224 (FIGS. 18 and 20). The rail mounting clip 320 may include holes 126 to attach the rail mounting clip 320 to a respective structural purlin 110. In another aspect of the embodiments, rail mounting clip 320 includes offset holes or slots 128 that enable the rail mounting clip 320 at second segment 224 to connect to a rail assembly 140. The offset holes or slots 128 in the second segment 224 create a desired angle of inclination for the photovoltaic panel 150. Rail mounting clip 320, in one aspect of the embodiments, may include a wire router in the form of a hole 130 (FIG. 20) for passing wires through the louvered canopy 300. The diameter of hole(s) 130 may accommodate wiring and connectors from the canopy 300. For example, a non-limiting size for hole 130 is in a range between about 1.0 inch and 1.5 inch (25 mm-38 mm). Hole 130 for the rail mounting clip 320, where included, enables neat and tidy wire management, particularly with photovoltaic panels 150 whose junction boxes and wires are positioned in a center of a lengthwise side of the photovoltaic panel 150.

As discussed elsewhere herein, rail mounting clip 320 may be structured to define a gap between photovoltaic modules. The gap can be provided to accommodate thermal expansion of solar modules 150. Rail mounting clip 320 might be modified in dimension, such as by being coped or cut at an angle, if necessary, to prevent photovoltaic panel(s) 150 from resting on an angle top edge 228 of second segment 224 of the rail mounting clip 320. In a further aspect of the embodiment, rail assembly 140 and rail mounting clip 320 can be preassembled and finished off site. In an additional aspect of the embodiments, rail assembly 140 and rail mounting clip 320 can support photovoltaic panel(s) 150 at an incline, even in extreme wind, snow, and seismic loading conditions. Further, structural purlin 140 spanning between beams 190 can be installed horizontally of a portion of the louvered canopy 300. A further aspect of the embodiments enables structural purlin 110 spanning between beams 190 to be installed at a slight incline to follow an average grade on surface lot of the louvered canopy 300. Moreover, a still further aspect of the embodiments includes a single structural purlin 110 spanning between beams 190 that can be installed on a building.

Figure 26:
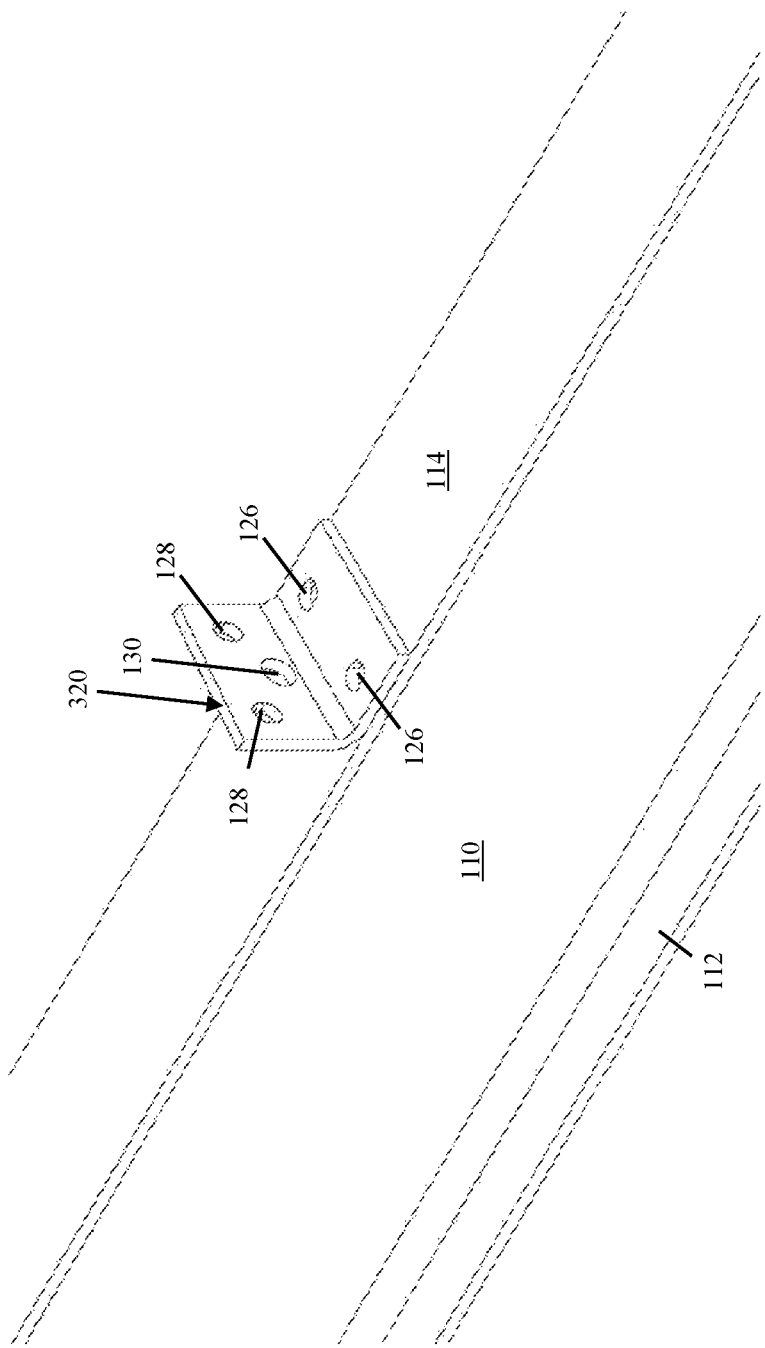
FIG. 26 is a partial perspective view of a louvered canopy according to embodiments of the disclosure.

Structural purlin 110 as per aspects of the embodiments, may include a wide-flange beam, built-up member, a composite beam, HSS tube steel, or similar shape purlin. As per certain aspects of the embodiment, structural purlin 110 can be provided with a length in a size range between about six inch and about eighteen inch (152 mm-457 mm) or greater, and the structural purlin 110 can be capable of spanning greater distances in a range between about twenty-five feet and sixty feet (7.5 m-18 m) or more. With reference to FIG. 26, in louvered canopy 300 configuration, rail assembly 140 may include a set of parallel rails, each indicated as rail 140L (left) and rail 140R (right), mounted by rail mounting clip 320 to separate structural purlins 110. Rail mounting clip 320 as embodied by the disclosure are provided with the appropriately angled top edge 328 to match the incline of rails 140L, 140R.

Figure 27:
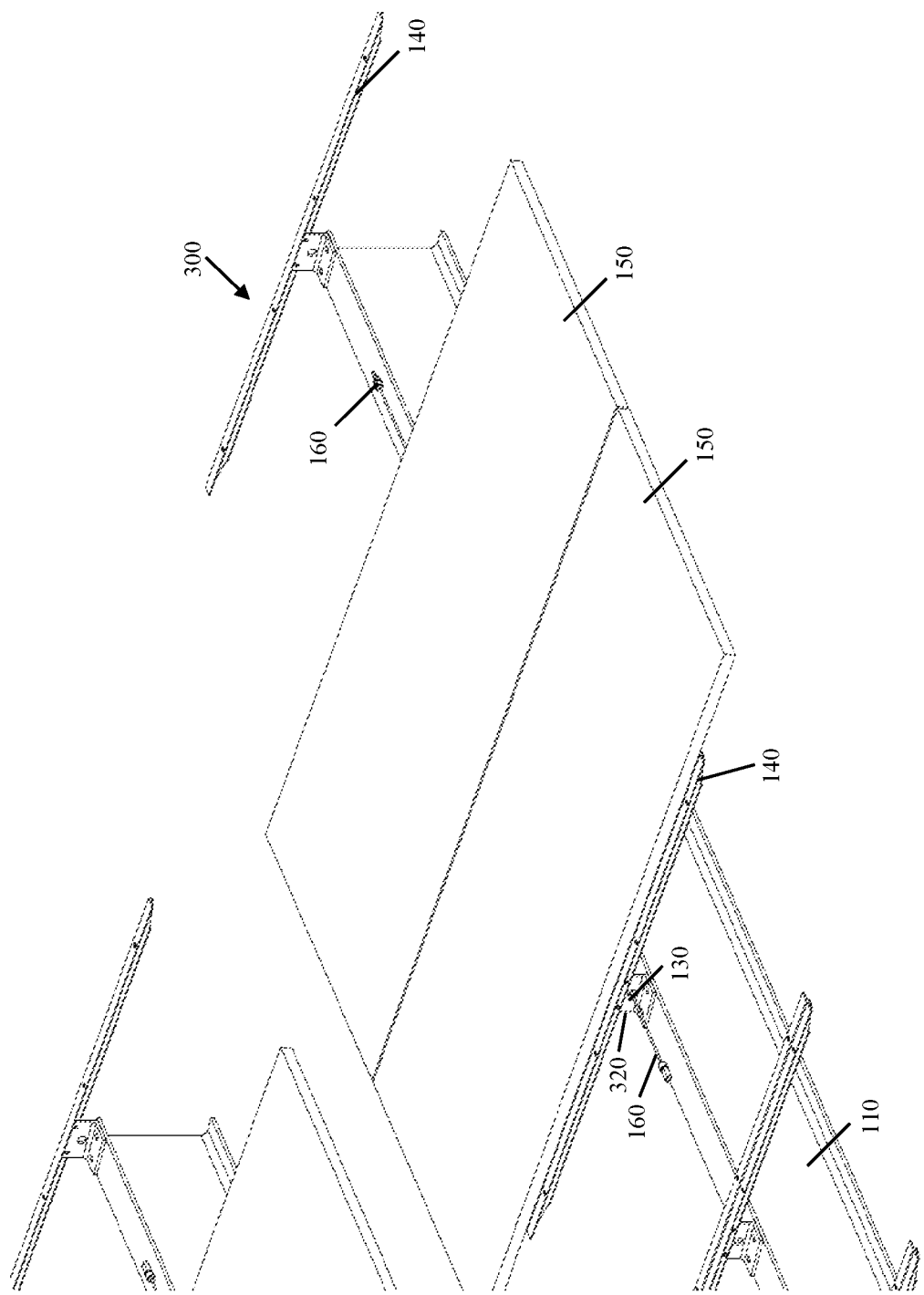
FIG. 27 is an expanded perspective view of a louvered canopy and wire router according to embodiments of the disclosure.

With particular reference to FIG. 27, and as discussed elsewhere herein, hole 130 of rail mounting clip 220 may act as a wire router for passing one or more wires 160 for operating photovoltaic panel(s) 150 through rail mounting clip(s) 220. Wire 160 may be embodied as any currently known or later developed electrical transmission line for transmitting and/or receiving electrical energy for photovoltaic panel(s) 150 in the form of power connections, signals, etc., allowing photovoltaic panel(s) 150 to operate. Hole 130 thus may allow wires 160 to pass freely through certain components of canopy 300 without being obstructed or blocked by any of its components.

Figure 28:
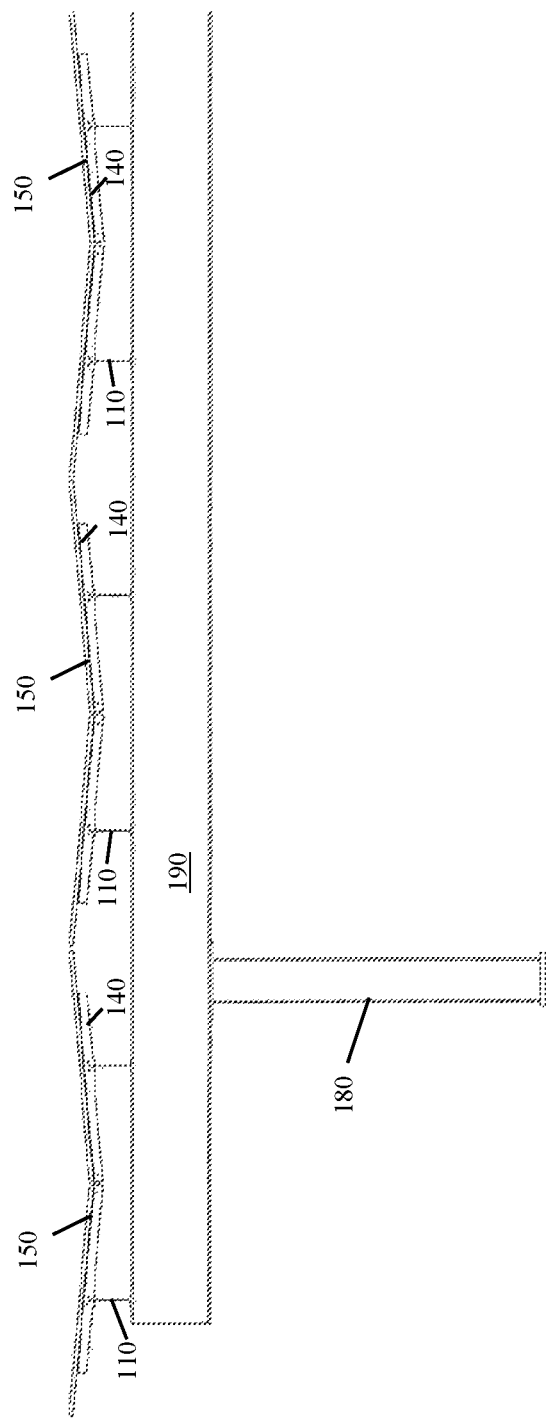
FIG. 28 is a partial side view of a dual slope canopy including a rail assembly, according to embodiments of the disclosure.
Figure 29:
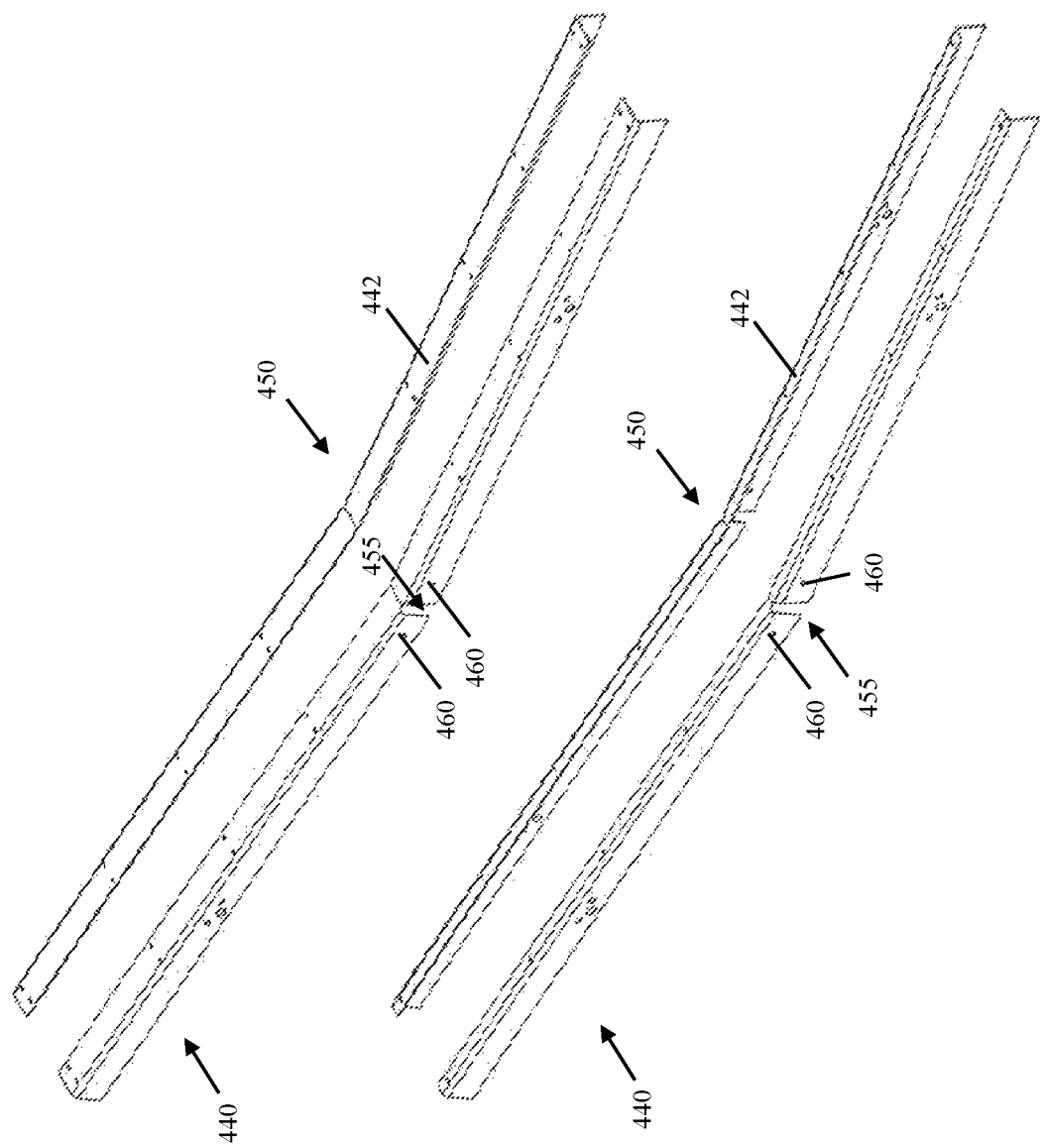
FIG. 29 is a close up view of a dual slope canopy including rail assembly, according to embodiments of the disclosure.

With reference to FIGS. 28 and 29, a further embodiment of a dual slope canopy 400 is illustrated. Dual slope canopy 400 includes rail mounting clip 220 for coupling photovoltaic panel(s) 150 of an array to structural purlin(s) 110 that spans further between support beams 180, similar to dual slope canopy 200 of FIGS. 11-20, however, dual slope canopy 400 may include a one-piece rail assembly 440 to support adjacent photovoltaic panels 150. In contrast to dual slope canopy 200, the dual slope canopy 400 includes one-piece rail assembly 440 in lieu of the two rail assemblies 140 joined by a flat bar with holes of dual slope canopy 200 of FIGS. 11-19. One-piece rail assembly 440 will be described hereinafter, and the remainder of the elements of the dual slope canopy 400 are as described above with respect to the dual slope canopy 200. Accordingly, a further discussion of elements of the dual slope canopy 400 is omitted, with reference to dual slope canopy 200 for those aspects.

Dual slope canopy 400, as with other embodiments shown in FIGS. 11-19 and discussed herein, may be supported by pairs of structural purlins 110, on beam 190 supported by a column 180. When viewed directly, photovoltaic panels 150 may, in conjunction with each other and with beams 190 and column 180, form any of various shapes advantageous in collecting solar energy and possibly directing water to a water management system. Such shapes may include, by way of example, mirrored angling of respective ones of the photovoltaic panels 150 to form "V" shapes with regard to immediately adjacent photovoltaic panels 150; "W" shapes with regard to sets of four immediately adjacent interior photovoltaic panels 150; and a "W-T" or "V-T" shape formed by adjacent ones of the photovoltaic panels (the "V" or the "W") 150 atop the beams 190 and columns 180 (in combination, the "T").

One-piece rail assembly 440 may be embodied as a single unit, extending continuously from end to end at an angled shape, the rail assembly 440 including a segment 442 and a segment 444 that each have one or more holes or slots therein. Segment 442 extends vertically to connect to custom clip or angle bracket 220. Segment 444 extends horizontally to attach to a long edge of photovoltaic panel 150. One-piece rail assembly 440 may include a cut-out 455 in segment 444 at low point 450. Cut-out 455 may enable one-piece rail assembly 440 to be bent at the low point to generally form a "V" configuration. Cut-out 455 can be of any length "L" and can a uniform length over the height of segment 444. Additionally or alternatively, cut-out 455 can be formed of variable length "L" over the height of segment 444, as long as a bend can be formed therein. As noted above, the cut-out 455 enables one-piece rail assembly 440 to be bent at the low point to generally form a "V" configuration.

One-piece rail assembly 440 may along a lengthwise (e.g., longer) edge of photovoltaic panel 150 at its frame, be bent (as described hereinafter) at a low point 450 and runs along a lengthwise edge of another photovoltaic panel 150 frame (e.g., as shown in FIG. 35). Photovoltaic panels 150 may be disposed at equal, opposite angular slopes or orientations to a horizontal axis, e.g., such that the "V" configuration forms an angle. However, the equal but opposite angular slopes or orientations to form angle to a horizontal axis of photovoltaic panels 150 may not always be possible due to various factors, including but not limited to lot topography, manufacturing variances, and other such factors. Cut-out 455 of one-piece rail assembly 440 enables differing angular slopes or orientations of photovoltaic panels 150. Cut-out 455 of one-piece rail assembly 440 may enable the "V" configuration to be formed with different slopes or orientations of photovoltaic panels 150 where the sides of one-piece modular rail 440 may be bent at different slopes or orientations to form a particular angle.

One-piece rail assembly 440, in accordance with an aspect of the embodiments, can be formed from a metallic material, hot-rolled structural steel. One-piece rail assembly may include other metallic materials, now known or hereinafter developed, such as lightweight metallic materials such as aluminum. One-piece rail assembly 440 is configured to connect to pre-punched holes or slots (not illustrated for ease of illustration), where the pre-punched holes or slots are disposed in an opposing direction for adjustability. The connection of one-piece rail assembly 440 to photovoltaic panel 150 frame can be achieved, for instance, by using stainless steel hardware and bonded using Washers for Electrical Equipment Bonding (or WEEBs). The material composition of a frame for photovoltaic panel 150 may be bonded and/or reinforced to one-piece rail assembly 440 prevents deflection of the photovoltaic panel 150. Preventing deflection avoids torsion, degradation, etc., of photovoltaic panel 150 performance due to the "micro-cracks" phenomenon. Structural reinforcement also enables using relatively thin-framed photovoltaic panels 150 in higher loading regions where elevated wind, snow, and seismic forces may otherwise be problematic or prevent deployment altogether.

One-piece rail assembly 440 may be straight cut at its ends. Alternatively, one-piece rail assembly 440 formed from structural steel angle may be formed in an ornamental shape. In another alternative aspect of the embodiments, one-piece rail assembly 440 may be angle cut or formed in an ornamental shape at its ends. One-piece rail assembly 440 may include a hot dipped galvanized finish, a powder-coated finish, a painted finish, and/or combinations thereof. An aspect of the dual slope canopy 400 with one-piece rail assembly 440 may connect to and/or and incorporate a water and ice management structure. Such water and ice management structures are set forth in U.S. Pat. Nos. 10,941,574 and 10,920,424, assigned to assignee of this application, the entire contents of which are incorporated by reference.

Dual slope canopy 400 with segment 444 of the one-piece rail assembly 440 may include connection apertures 460. Connection apertures 460 are provided on opposite sides of the cut-out 455. Connection apertures 460 are configured to mount a support strap 470 (FIG. 30) that spans across cut-out 455. Strap 470 may be secured to segment 444 by a fastener, such as but not limited to bolts, rivets, screws, or other such mechanical connections, now known or hereinafter developed. Strap 470 additionally or alternatively secured to segment 444 by physical connection(s), such as but not limited to welding, brazing, and other such physical connections, now known or hereinafter developed. Strap 470 may limit, restrict, and/or prevent the cut-out 455 from increasing or decreasing in length L when the strap 470 is secured to the segment 444.

Figure 30:
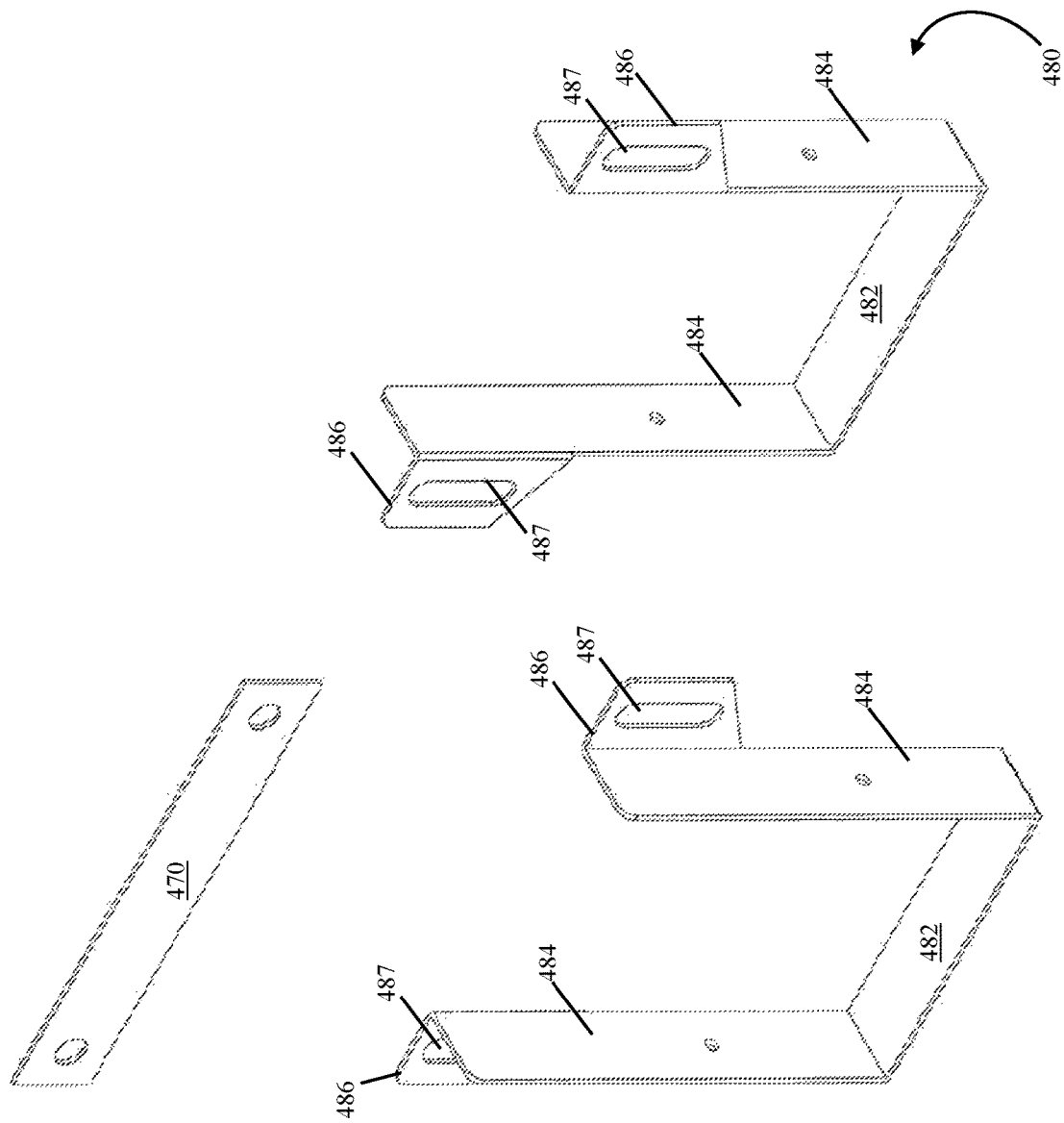
FIG. 30 is an exploded view of a gutter bracket for use with the dual slope canopy including a rail assembly according to embodiments of the disclosure.
Figure 31:
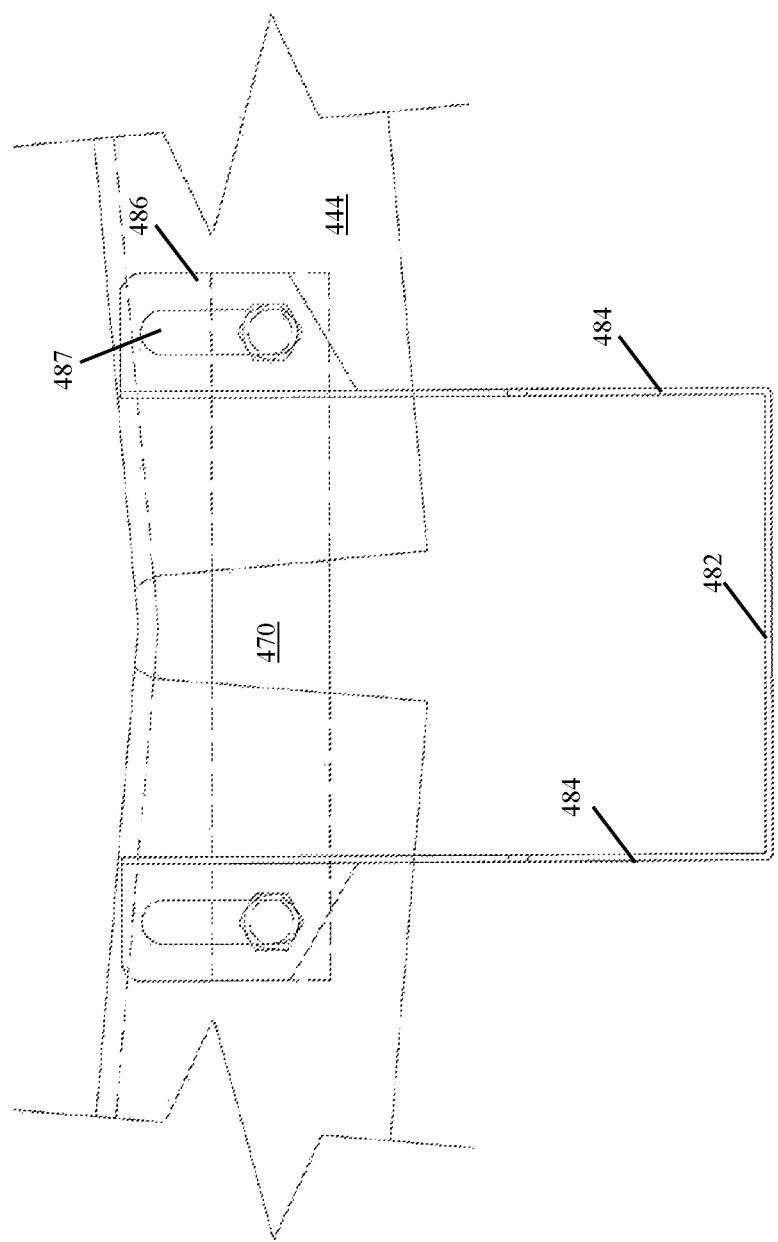
FIG. 31 is a schematic illustration of the gutter bracket attached to a rail assembly for use with the dual slope canopy according to embodiments of the disclosure.

Connection apertures 460 may be on opposite sides of the cut-out 455 and are configured to mount and support a gutter bracket 480 (see FIG. 30). Gutter bracket 480 and strap 470 may be mounted to connection apertures 460 together, or separately. Gutter bracket 480 and strap 470 may be mounted to connection apertures 460 using the same mechanical connections or physical connections, including but not limited to those noted above. Gutter bracket 480 (See FIGS. 30 and 31) may include a generally "U" shaped bracket, with a base 482, two opposed upstanding legs 484 connected to base 482, and connection flanges 486 on opposed upstanding legs 484 connected to base 482. Connection flanges 486 are oriented generally orthogonal to opposed upstanding legs 484. Thus, connection flanges 486 may lie against segment 444 of one-piece rail assembly 440. Connection flanges 486 may include slots 487 therein. Slots 487 are configured to overlie connection apertures 460. Slots 487 enable gutter bracket 480 to be adjustably mounted to the one-piece rail assembly 440 in an essentially vertical direction. Accordingly, when a gutter (not illustrated) of a water and ice management system is employed with dual slope canopy 400, gutter bracket 480 can be positioned at an orientation where gutter bracket 480 does not foul or contact rail mounting clip 220 or photovoltaic panel 150, or otherwise interfere the support and mounting of the sloping or dual slope canopy 400. In cases where a gutter (not illustrated) of a water and ice management system is employed with dual canopy 400, the gutter may be appropriately mounted with a pitch to enable drainage therethrough.

Base 482 of gutter bracket 480 may be configured to support a gutter. Thus, base 482 of gutter bracket 480 may be flat, as illustrated to support a gutter with a flat bottom. Alternatively, base 482 of gutter bracket 480 may be curved, triangular, or in any configuration that conforms to the shape of a gutter employed with a water and ice management system. Other aspects of the dual slope canopy 400 may include rail assembly 440 being connected to structural purlin 110 via rail mounting clip 220. Rail mounting clip 220 can be formed of a metallic material and may be an angled or bent plate. The rail mounting clip 220 may be provided from material with thicknesses in a range between about 0.25 inch and 0.50 inch (6 mm-12.7 mm).

Accordingly, in an aspect of the embodiments, rail mounting clip 220 of the dual slope canopy 400 may include a first segment 222 and a second segment 224. Rail mounting clip 220 may include holes 126 to attach rail mounting clip 220 to a respective single structural purlin 110. In another aspect of the embodiments, rail mounting clip 220 includes offset holes or slots 128 that enable rail mounting clip 220 at second segment 224 to connect to a one-piece rail assembly 440. Slots 128 in the second segment 224 may create a desired angle of inclination for the photovoltaic panel 150.

Rail mounting clip 220, in some embodiments of dual slope canopy 400, may include a hole 130 or any other wire router. Hole 130, where included has a diameter to accommodate wiring and connectors (e.g., wires(s) 160 of FIGS. 10, 19, and 29 discussed herein) from the canopy 400. For example, a non-limiting size for hole 130 is in a range between about 1.0 inch and 1.5 inch (25 mm-38 mm). Hole 130 for rail mounting clip 220 enables neat and tidy wire management, particularly with photovoltaic panels 150 whose junction boxes and wires are positioned in a center of a lengthwise side of the photovoltaic panel 150. In another example, rail mounting clip 220 is shaped to provide a gap between photovoltaic modules. The gap can be provided for thermal expansion of the solar modules 150. Rail mounting clip 220 might be modified in dimension, such as by being coped or cut at an angle, if necessary, to prevent a photovoltaic panel 150 from resting on an angle top edge 228 of second segment 224 of the rail mounting clip 220. In a further aspect of the embodiment, one-piece rail assembly 440 and rail mounting clip 220 can be preassembled and finished off site.

In further embodiments of dual slope canopy 400, one-piece rail assembly 440 and rail mounting clip 220 can support photovoltaic panels 150 at an incline, even in extreme wind, snow, and seismic loading conditions. Further, a single structural purlin 110 spanning between beams 190 can be installed horizontally of a portion of dual slope canopy 400. A further aspect of the dual-sloping or "W"-shape canopy 400 embodiments enables structural purlin(s) 110 spanning between beams 190 to be installed at a slight incline to follow an average grade on surface lot of dual slope canopy 400. Some embodiments of dual slope canopy 400 may include a single structural purlin 110 spanning between beams 190 that can be installed on a building. A structural purlin 110 as per aspects of dual slope canopy 400 embodiments, may include be a wide-flange beam, built-up member, a composite beam, HSS tube steel, or similar shape purlin. As discussed elsewhere herein, structural purlin 110 in some cases may have a length in a size range between about six inches and about eighteen inches (152 mm-457 mm) or greater, and structural purlin 110 can span spanning greater distances in a range between about twenty-five feet and about sixty feet (7.5 m-18 m) or more.

Embodiments of the disclosure include various technical and commercial advantages described herein, in addition to the ability to provide further advantages not explicitly discussed. For instance, various embodiments of the disclosure may also provide the ability to incorporate water and ice management structures. Such water and ice management structures are set forth in U.S. Pat. Nos. 10,941,574 and 10,920,424, assigned to assignee of this application, where the entire contents are incorporated by reference.

A technical effect of the embodiments as set forth arise from the structure of various rail assembly and rail mounting clip structures described and shown herein. Such structures may enable any desired number of structural purlins to be used (i.e., as few as one) for each photovoltaic panel, which in turn increases the applicability and scalability of canopies incorporating embodiments of the disclosure. Various embodiments of the disclosures thus also enable deploying cost-effective and architectural solar canopies in otherwise cost-prohibitive situations and technically challenging environments.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A structure comprising:
   a rail mounting clip including:
      a first segment shaped for mounting on a purlin surface, and
      a second segment at a lateral end of the first segment and extending perpendicularly outwardly therefrom; and
   a rail assembly coupled to the rail mounting clip and having a slot substantially aligned with a centerline axis of the rail assembly, the slot receiving the second segment of the rail mounting clip, wherein the rail assembly is substantially L-shaped, a lower surface of the rail assembly overlaps an upper surface of the second segment of the rail mounting clip, and a lengthwise edge of a photovoltaic panel rests along a length of the rail assembly.

2. The structure of claim 1, wherein an upper surface of the second segment includes an upper free edge and is angled relative to the purlin surface.

3. The structure of claim 1, further comprising an aperture within the rail mounting clip, wherein the aperture defines an integrated wire router shaped for passage of wires from the photovoltaic panel therethrough.

4. The structure of claim 1, further comprising a structural purlin having the purlin surface thereon, wherein the structural purlin is oriented horizontally perpendicularly with respect to the rail assembly.

5. The structure of claim 1, wherein the rail assembly includes a pair of parallel rails having the slot therebetween.

6. The structure of claim 5, wherein the pair of parallel rails are each configured to mount a respective one of a pair of photovoltaic panels thereon, such that the rail assembly is configured for a pair of opposing lengthwise edges of each of the pair photovoltaic panels to rest lengthwise alongside the pair of parallel rails.

7. A canopy structure, comprising:
   a plurality of structural purlins each mounted on a beam with an orientation horizontally perpendicular to an orientation of the beam;
   a plurality of rail mounting clips each located on a surface of a respective structural purlin, wherein each of the plurality of rail mounting clips includes:
      a first segment shaped for mounting on the surface of the respective structural purlin, and
      a second segment at a lateral end of the first segment and extending perpendicularly outwardly therefrom, wherein an upper surface of each second segment includes an upper free edge and is angled relative to the surface of the respective structural purlin thereunder, and the plurality of rail mounting clips having the upper surfaces being uniformly shaped to define a louvered canopy or a dual slope canopy; and
   a plurality of rail assemblies each coupled to a respective one of the plurality of rail mounting clips, and having a slot substantially aligned with a centerline axis of the rail assembly, the slot receiving the second segment of the respective rail mounting clip, wherein a lengthwise edge of a photovoltaic panel rests along a length of the rail assembly.

8. The canopy structure of claim 7, wherein at least two of the plurality of rail mounting clips have upper surfaces sloped toward each other.

9. The canopy structure of claim 7, wherein the upper surface of each second segment has a substantially uniform geometry.

10. The canopy structure of claim 7, further comprising an aperture within at least one of the plurality of rail mounting clips, wherein the aperture defines an integrated wire router shaped for passage of wires from the photovoltaic panel therethrough.

11. The canopy structure of claim 10, wherein at least one of the plurality of rail assemblies is substantially L-shaped and overlaps the upper surface of the second segment of one of the plurality of rail mounting clips.

12. The canopy structure of claim 7, wherein at least one of the plurality of rail assemblies includes a pair of parallel rails having the slot therebetween.

13. The canopy structure of claim 12, wherein the pair of parallel rails are each configured to mount a respective one of a pair of photovoltaic panels thereon, such that at least one of the plurality of rail assemblies is configured for a pair of opposing lengthwise edges of each of the pair of photovoltaic panels to rest lengthwise alongside the pair of parallel rails.

14. The structure of claim 1, wherein the rail assembly comprises a one-piece rail assembly, and the photovoltaic panel is one of a plurality of photovoltaic panels each having a respective lengthwise edge resting along a length of the one-piece rail assembly.

15. A structure comprising:
   a rail mounting clip including:
      a first segment shaped for mounting on a purlin surface, and
      a second segment at a lateral end of the first segment and extending perpendicularly outwardly therefrom;
   a rail assembly coupled to the rail mounting clip and having a slot substantially aligned with a centerline axis of the rail assembly, the slot receiving the second segment of the rail mounting clip, wherein a lengthwise edge of a photovoltaic panel rests along a length of the rail assembly; and
   a gutter bracket mounted on a connection aperture of the rail assembly and an adjacent connection aperture of an adjacent rail assembly, wherein the gutter bracket is shaped to support a gutter of a water and ice management system between two adjacent photovoltaic panels.

16. The structure of claim 15, wherein a lower surface of the rail assembly overlaps an upper surface of the second segment of the rail mounting clip.

17. The structure of claim 16, wherein the rail assembly is substantially L-shaped.

18. The structure of claim 15, wherein an upper surface of the second segment includes an upper free edge and is angled relative to the purlin surface.

19. The structure of claim 15, further comprising a structural purlin having the purlin surface thereon, wherein the structural purlin is oriented horizontally perpendicularly with respect to the rail assembly.

20. The structure of claim 15, wherein the rail assembly includes a pair of parallel rails having the slot therebetween.

21. The structure of claim 20, wherein the pair of parallel rails are each configured to mount a respective one of a pair of photovoltaic panels thereon, such that the rail assembly is configured for a pair of opposing lengthwise edges of each of the pair photovoltaic panels to rest lengthwise alongside the pair of parallel rails.

* * * * *